United States Patent
Johnson et al.

(10) Patent No.: US 8,504,463 B2
(45) Date of Patent: *Aug. 6, 2013

(54) BIDDING FOR ENERGY SUPPLY

(75) Inventors: Jack J. Johnson, Madison, NJ (US); William F. Coyle, Summit, NJ (US)

(73) Assignee: Geophonic Networks, Inc., Madison, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/890,044

(22) Filed: Aug. 3, 2007

(65) Prior Publication Data

US 2007/0271173 A1 Nov. 22, 2007

Related U.S. Application Data

(63) Continuation of application No. 10/633,937, filed on Aug. 4, 2003, which is a continuation of application No. 10/062,798, filed on Jan. 31, 2002, now abandoned, which is a continuation of application No. 09/542,451, filed on Apr. 4, 2000, now Pat. No. 6,598,029, which is a continuation-in-part of application No. 09/023,968, filed on Feb. 13, 1998, now Pat. No. 6,047,274.

(60) Provisional application No. 60/064,421, filed on Oct. 30, 1997, provisional application No. 60/039,041, filed on Feb. 24, 1997.

(51) Int. Cl.
*G06Q 40/00* (2006.01)
*G06F 17/00* (2006.01)

(52) U.S. Cl.
USPC .......................................... 705/37; 705/412

(58) Field of Classification Search
USPC .......... 705/412, 37, 26, 27, 26.1, 26.2, 26.25, 705/26.3, 26.35, 26.4, 26.41, 26.42, 26.43, 705/26.44, 27.1, 27.2; 340/870.02, 870.03
See application file for complete search history.

(56) References Cited

U.S. PATENT DOCUMENTS 2,841,331 A 7/1958 Starr et al.
3,573,747 A 4/1971 Adams et al.
(Continued)

FOREIGN PATENT DOCUMENTS

EP 0 329 901 A2 12/1988
EP 0 411 748 A2 2/1991
(Continued)

OTHER PUBLICATIONS

Cramton, et al., "Auction Design for Standard Offer Service," Charles River Associates and Market Design, Inc, Jun. 30, 1997 (date shown in header), 21 pages.

(Continued)

*Primary Examiner* — Igor Borissov

(57) ABSTRACT

An auction service is provided that stimulates competition between energy suppliers (i.e., electric power or natural gas). A bidding moderator receives offers from competing suppliers specifying the economic terms each is willing to offer to end users or resellers for estimated quantities of electric power or gas supply (separate auctions). Suppliers receive feedback from the moderator based on competitors' offers and have the opportunity to adjust their own offers down or up, depending on whether they want to encourage or discourage additional energy delivery commitments in a particular geographic area or to a particular customer group. Each supplier's offers can also be changed to reflect each supplier's capacity utilization. The moderator selects one or more suppliers to provide electric power or natural gas to each end user or reseller, with each supplier providing at least a portion of the electric power or natural gas needed by each end user or reseller during a specific future time interval.

47 Claims, 16 Drawing Sheets

U.S. PATENT DOCUMENTS

| | | | |
|---|---|---|---|
| 3,581,072 A | 5/1971 | Nymeyer |
| 3,683,161 A | 8/1972 | Stadlin |
| 3,740,572 A | 6/1973 | Cohn |
| 3,913,829 A | 10/1975 | Fink |
| 4,254,472 A | 3/1981 | Juengel et al. |
| 4,412,287 A | 10/1983 | Braddock |
| 4,415,896 A | 11/1983 | Allgood |
| 4,568,934 A | 2/1986 | Allgood |
| 4,674,044 A | 6/1987 | Kalmus et al. |
| 4,677,552 A | 6/1987 | Sibley, Jr. |
| 4,789,928 A | 12/1988 | Fujisaki |
| 4,811,011 A | 3/1989 | Sollinger |
| 4,817,131 A | 3/1989 | Thornborough et al. |
| 4,862,493 A | 8/1989 | Venkataraman |
| 4,903,201 A | 2/1990 | Wagner |
| 5,077,665 A | 12/1991 | Silverman et al. |
| 5,136,501 A | 8/1992 | Silverman et al. |
| 5,168,446 A | 12/1992 | Wiseman |
| 5,237,507 A | 8/1993 | Chasek |
| 5,243,515 A | 9/1993 | Lee |
| 5,274,571 A | 12/1993 | Hesse et al. |
| 5,297,031 A | 3/1994 | Gutterman et al. |
| 5,375,055 A | 12/1994 | Togher et al. |
| 5,394,324 A | 2/1995 | Clearwater |
| 5,432,710 A | 7/1995 | Ishimaru et al. |
| 5,463,547 A | 10/1995 | Markowitz et al. |
| 5,508,913 A | 4/1996 | Yamamoto et al. |
| 5,519,622 A | 5/1996 | Chasek |
| 5,598,349 A | 1/1997 | Elliason et al. |
| 5,606,602 A | 2/1997 | Johnson et al. |
| 5,615,269 A | 3/1997 | Micali |
| 5,621,654 A | 4/1997 | Cohen et al. |
| 5,627,759 A | 5/1997 | Bearden et al. |
| 5,640,569 A | 6/1997 | Miller et al. |
| 5,664,115 A | 9/1997 | Fraser |
| 5,696,501 A | 12/1997 | Ouellette et al. |
| 5,715,402 A | 2/1998 | Popolo |
| 5,727,165 A | 3/1998 | Ordish et al. |
| 5,737,730 A | 4/1998 | Alvarenga et al. |
| RE35,793 E | 5/1998 | Halpern |
| 5,748,104 A | 5/1998 | Argyroudis et al. |
| 5,758,328 A | 5/1998 | Giavannoli |
| 5,758,331 A | 5/1998 | Johnson |
| 5,786,683 A | 7/1998 | Williams |
| 5,790,642 A | 8/1998 | Taylor et al. |
| 5,794,207 A | 8/1998 | Walker et al. |
| 5,794,212 A | 8/1998 | Mistr, Jr. |
| 5,794,219 A | 8/1998 | Brown |
| 5,802,502 A | 9/1998 | Gell et al. |
| 5,818,725 A | 10/1998 | McNamara et al. |
| 5,818,914 A | 10/1998 | Fujisaki |
| 5,832,457 A | 11/1998 | O'Brien et al. |
| 5,835,896 A | 11/1998 | Fisher et al. |
| 5,845,266 A | 12/1998 | Lupien et al. |
| 5,862,325 A | 1/1999 | Reed et al. |
| 5,873,071 A | 2/1999 | Ferstenberg et al. |
| 5,873,251 A | 2/1999 | Iino |
| 5,890,138 A | 3/1999 | Godin et al. |
| 5,894,422 A | 4/1999 | Chasek |
| 5,897,607 A | 4/1999 | Jenney et al. |
| 5,905,974 A | 5/1999 | Fraser et al. |
| 5,905,975 A | 5/1999 | Ausubel |
| 5,920,847 A | 7/1999 | Kolling et al. |
| 5,924,082 A | 7/1999 | Silverman et al. |
| 5,930,773 A | 7/1999 | Crooks et al. |
| 5,950,178 A | 9/1999 | Borgato |
| 5,974,403 A | 10/1999 | Takriti et al. |
| 6,005,925 A | 12/1999 | Johnson et al. |
| 6,005,926 A | 12/1999 | Mashinsky |
| 6,009,154 A | 12/1999 | Ricken et al. |
| 6,014,643 A | 1/2000 | Minton |
| 6,021,398 A | 2/2000 | Ausubel |
| 6,021,402 A | 2/2000 | Takriti |
| 6,023,686 A | 2/2000 | Brown |
| 6,026,383 A | 2/2000 | Ausubel |
| 6,044,363 A | 3/2000 | Mori et al. |
| 6,047,274 A | 4/2000 | Johnson et al. |
| 6,061,660 A | 5/2000 | Eggleston et al. |
| 6,085,169 A | 7/2000 | Walker et al. |
| 6,098,051 A | 8/2000 | Lupien et al. |
| 6,108,639 A | 8/2000 | Walker et al. |
| 6,115,698 A | 9/2000 | Tuck et al. |
| 6,122,603 A | 9/2000 | Budike, Jr. |
| 6,131,087 A | 10/2000 | Luke et al. |
| 6,134,534 A | 10/2000 | Walker et al. |
| 6,141,653 A | 10/2000 | Conklin et al. |
| 6,144,727 A | 11/2000 | Mashinsky |
| 6,151,589 A | 11/2000 | Aggarwal et al. |
| 6,161,099 A | 12/2000 | Harrington et al. |
| 6,167,124 A | 12/2000 | Johnson et al. |
| 6,167,386 A | 12/2000 | Brown |
| 6,202,051 B1 | 3/2001 | Woolston |
| 6,230,146 B1 | 5/2001 | Alaia et al. |
| 6,243,691 B1 | 6/2001 | Fisher et al. |
| 6,253,188 B1 | 6/2001 | Witek et al. |
| 6,269,157 B1 | 7/2001 | Coyle |
| 6,285,989 B1 | 9/2001 | Shoham |
| 6,300,948 B1 | 10/2001 | Geller et al. |
| 6,321,212 B1 | 11/2001 | Lange |
| 6,343,277 B1 | 1/2002 | Gaus et al. |
| 6,396,839 B1 | 5/2002 | Ardalan et al. |
| 6,408,283 B1 | 6/2002 | Alaia et al. |
| 6,415,270 B1 | 7/2002 | Rackson |
| 6,473,744 B1 | 10/2002 | Tuck et al. |
| 6,493,683 B1 | 12/2002 | David et al. |
| 6,529,839 B1 | 3/2003 | Uggerud et al. |
| 6,564,192 B1 | 5/2003 | Kinney, Jr. et al. |
| 6,598,029 B1 | 7/2003 | Johnson et al. |
| 6,618,709 B1 | 9/2003 | Sneeringer |
| 6,647,373 B1 | 11/2003 | Carlton-Foss |
| 6,718,312 B1 | 4/2004 | McAfee et al. |
| 6,785,592 B1 | 8/2004 | Smith et al. |
| 6,850,907 B2 | 2/2005 | Lutnick et al. |
| 6,862,580 B1 | 3/2005 | Ford |
| 6,871,191 B1 | 3/2005 | Kinney, Jr. et al. |
| 6,915,185 B2 | 7/2005 | Yamamoto |
| 6,990,395 B2 | 1/2006 | Ransom et al. |
| 7,010,511 B1 | 3/2006 | Kinney, Jr. et al. |
| 7,085,739 B1 | 8/2006 | Winter et al. |
| 7,249,085 B1 | 7/2007 | Kinney, Jr. et al. |
| 7,343,360 B1 | 3/2008 | Ristanovic et al. |
| 7,478,070 B2 | 1/2009 | Fukul et al. |
| 2001/0032197 A1 | 10/2001 | Chandra et al. |
| 2001/0034688 A1 | 10/2001 | Annunziata |
| 2002/0038279 A1 | 3/2002 | Samuelson et al. |
| 2003/0033238 A1 | 2/2003 | Oskielunas et al. |
| 2004/0015428 A2 | 1/2004 | Johnson et al. |
| 2004/0015433 A1 | 1/2004 | Johnson et al. |
| 2008/0010182 A2 | 1/2008 | Johnson et al. |

FOREIGN PATENT DOCUMENTS

| | | |
|---|---|---|
| EP | 0 571 889 A2 | 12/1993 |
| EP | 0 886 362 A1 | 12/1998 |
| EP | 0 893 775 A1 | 1/1999 |
| JP | 2001-184433 | 7/2001 |
| WO | WO 98/26363 | 6/1998 |
| WO | WO 98/38844 | 9/1998 |
| WO | WO 00/38093 | 6/2000 |
| WO | WO 00/58805 A3 | 10/2000 |
| WO | WO 01/06432 A1 | 1/2001 |
| WO | WO 01/28063 A1 | 4/2001 |
| WO | WO 01/33464 A1 | 5/2001 |
| WO | WO 01/41279 A1 | 6/2001 |
| WO | WO 01/75756 A1 | 10/2001 |

OTHER PUBLICATIONS

Cramton, et al., "Rules for Standard Offer Service," Charles River Associates and Market Design, Inc, Aug. 11, 1997 (date shown in header), 8 pages.

Cramton, et al., "Auction Design for Standard Offer Service," Charles River Associates and Market Design, Inc, Sep. 26, 1997 (date shown in header), 24 pages.

PCT International Search Report in connection with International Publication No. WO 01/75756 A1 (2 sheets).

PCT International Preliminary Examination Report in connection with International Publication No. WO 01/75756 A1 (5 sheets).

PCT International Search Report in connection with International Publication No. WO 98/38844 (2 sheets).
PCT International Preliminary Examination Report in connection with International Publication No. WO 98/38844 (10 sheets).
"Mitigating Greenhouse Gas Emissions: Voluntary Reporting; Increasing End-Use Energy Efficiency," Energy Information Administration, Oct. 1997 (123 pages).
Robert W. Kolb, "Futures, Options & Swaps," Blackwell Publishers, Inc., Third Edition, published 1999.
Rozek, "Competitive Bidding in Electricity Markets: A Survey," The Energy Journal, 1989, vol. 10, No. 4 (15 pages).
Schmerken, "Lights Out: What Killed Off the California Power Exhange?" Wall Street & Technology, Apr. 1, 2001 (7 pages).
Sales, "CME vs. CBOT: Separate and Unequal," Wall Street & Technology, Feb. 1, 2001 (5 pages).
Preist, "Commodity Trading Using an Agent-Based Iterated Double Auction," ACM, 1999 (9 pages).
Cory, "Expert Systems for Power Applications," IEE Review, Apr. 1988, pp. 147-149.
Veall, "On Estimating the Effects of Peak Demand Pricing," Journal of Applied Econometrics, Jan. 1986, vol. 1, pp. 81-93.
Engle, et al., "Modelling Peak Electricity Demand," Journal of Forecasting, 1992, vol. 11, pp. 241-251.
Gribik, "Learning From California's QF Auction," Public Utilities Fortnightly, Apr. 15, 1995 (5 pages).
Weber, "Individual Welfare Maximization in Electricity Markets Including Consumer and Full Transmission System Modeling," Ph.D. Thesis, University of Illinois at Urbana—Champaign, 1999 (154 pages).
Richter, Jr., et al., "Genetic Algorithm Evolution of Utility Bidding Strategies for the Competitive Marketplace," IEEE Transactions on Power Systems, vol. 13, No. 1, Feb. 1997 (8 pages).
Richter, Jr., et al., "Comprehensive Bidding Strategies With Genetic Programming/Finite State Automata," IEEE Transactions on Power Systems, vol. 14, No. 4, Nov. 1999, (Copyright 1998) (8 pages).
Response to Requirement for Information filed on Jan. 16, 2007, in connection with U.S. Appl. No. 10/062,798, filed Jan. 31, 2002 (32 pages).
U.S. Appl. No. 60/143,846, filed Jul. 15, 1999, Sick, et al. (on PAIR system).
USPTO Office Action mailed Jul. 21, 2009 in connection with U.S. Appl. No. 10/633,937, filed Aug. 4, 2003.
USPTO Office Action mailed Jun. 27, 2008 in connection with U.S. Appl. No. 10/062,798, filed Jan. 31, 2002 (now abandoned).
Petition to Make Special Under 37 CFR 1.102d filed at USPTO on Jul. 14, 2003 in connection with U.S. Appl. No. 10/062,798, filed Jan. 31, 2002 (now abandoned).
R. Engle, et al., "A Comparison of Adaptive Structural Forecasting Methods for Electricity Sales," Journal of Forecasting, vol. 7, pp. 149-172 (1988).
W. Hogan, "Contract Networks for Electric Power Transmission," Journal of Regulatory Economics, vol. 4, No. 3, pp. 211-242 (Sep. 1992).
E. Kahn and S. Stoft, "Organization of Bulk Power Markets: A Concept Paper," Lawrence Berkeley National Laboratory—University of California Berkeley, pp. 9-11 (Dec. 1995).
E. Cazalet, et al., "The Power Market: E-Commerce for All Electricity Products," Public Utilities Fortnightly (Feb. 1, 2000).
B. McLean, "Need Electricity? Call Your Broker," Fortune (Sep. 29, 1997), pp. 153-156 (New York, NY).
K. Rose, "Using Auctions to Jump-Start Competition and Short-Circuit Incumbent Market Power," Public Utilities Fortnightly (Feb. 1, 1999), pp. 48-53 (Vienna, VA).
D. Warkentin, "Energy Marketing Handbook," PennWell Publishing Co. (1996), pp. 59-68 (Tulsa, OK).
S. Hunt, et. al, "Competition and Choice in Electricity," John Wiley & Sons Ltd. (1996), pp. 21-29, 53-75 (Chichester, West Sussex, England).
T. Brennan, et. al, "A Shock to the System—Restructuring America's Electricity Industry," published by Resources for the Future (1996), pp. 37-59 (Washington, D.C.).
P. Christiansen, "Retail Wheeling: A Guide for End Users," Second Edition, PennWell Publishing Co. (1996), pp. 75-98, 179-201 (Tulsa, OK).
P. Christiansen, "Retail Wheeling: A Guide for End Users," Third Edition, PennWell Publishing Co. (Sep. 1998), pp. 185-210 (Tulsa, OK).
P. Fox-Penner, "Electric Utility Restructuring: A Guide to the Competitive Era," Public Utilities Reports, Inc. (Apr. 1997), pp. 215-218, 261-290 (Vienna, VA).
A. Faruqui, et. al, "Customer Choice: Finding Value in Retail Markets," Public Utilities Reports, Inc. (Mar. 1999), pp. 309-329 (Vienna, VA).
J. Banatre, et. al, "The Design and Building of Enchere, a Distributed Electronic Marketing System," Communications of the ACM (Jan. 1986), pp. 19-29 (New York, NY).
M. Arny, "The Retail Energy Services Company Model for Restructuring the Electric Utility Industry," The Electricity Journal (Jan./Feb. 1996), pp. 80-88.
"The News in Focus—Continental Power Exchange Launches Trading Price Index," The Electricity Journal (Apr. 1996), pp. 8-9.
G. Sheble, "Price Based Operation in an Auction Market Structure," IEEE Transactions on Power Systems (Nov. 1996), vol. 11, No. 4, pp. 1770-1777.
M. Kriz, "Power Brokers," The National Journal (Nov. 30, 1996), vol. 28, No. 48, p. 2594 (8 pages).
J. Kumar, et. al, "Auction Game in Electric Power Market Place," Proceedings of the American Power Conference, 58th Annual Meeting (1996), vol. 58 (Chicago, IL).
R. Wilson, "Activity Rules for a Power Exchange," Working Paper, Stanford Business School, Stanford University (Feb. 21, 1997), pp. 1-22 (Stanford, CA).
R. Wilson, "Activity Rules for the Power Exchange," Report to the California Trust for Power Industry Restructuring, Stanford Univ. (Mar. 14, 1997), pp. 1-11 (Stanford, CA).
P. Joskow, "Restructuring, Competition and Regulatory Reform in the U.S. Electricity Sector," Journal of Economic Perspectives (Summer 1997), pp. 119-138 (Minneapolis, MN).
C. Wolfram, "Strategic Bidding in a Multi-Unit Auction: An Empirical Analysis of Bids . . . ," Paper #6269, Nat'l Bureau of Econ. Research (Nov. 1997), pp. 1-54 (Cambridge, MA).
W. Elmaghraby, "Multi-Unit Auctions with Dependent Valuations: Issues of Efficiency in Electricity Auctions," UC Energy Institute (Nov. 20, 1997), pp. 1-32 (Berkeley, CA).
C. Li, "Revenue Adequate Bidding Strategies in Competitive Electricity Markets," IEEE Transactions on Power Systems (May 1999), vol. 14, No. 2, pp. 492-497.
P. Gribik, "Transmission Access and Pricing with Multiple Separate Energy Forward Markets," IEEE Transactions on Power Systems (Aug. 1999), vol. 14, No. 3, pp. 865-876.
W. Elmaghraby, "The Efficiency of Multi-Unit Electricity Auctions," The Energy Journal (1999), vol. 20, No. 4, pp. 89-116.
K. McCabe, et. al, "Smart Computer-Assisted Markets," Science (Oct. 25, 1991), pp. 534-538 (Washington, D.C.).
K. Knutson, et. al, "IREMM—An Inter-Regional Electric Market Model, etc.," Power-Gen '92 Conference Papers (Nov. 1992), Book III, pp. 17-26 (Pennwell—Houston, TX).
S. Rassenti, et. al, "Designing a Real Time Computer Assisted Auction for Natural Gas Networks," New Directions in Computational Economics (1994), pp. 41-54 (Kluwer Publishers).
M. Jess, "Restructuring Energy Industries: Lessons from Natural Gas," Natural Gas Monthly (May 1997), pp. vii-xxi (Energy Information Administration, Washington, D.C.).
P. Cramton, "The FCC Spectrum Auctions: An Early Assessment," Journal of Economics & Management Strategy (Fall 1997), vol. 6, No. 3, pp. 431-495 (MIT, Boston, MA).
F. Wolak, "Market Design and Price Behavior in Restructured Electricity Markets, etc.," Power program (Aug. 1997), Working Paper PWP-051, pp. 1-35 (U. of Cal. Energy Institute).
B. O'Reilly, "Transforming the Power Business," Fortune (Sep. 29, 1997), pp. 143-152, 154-156 (New York, NY).
B. McLean, "Need Electricity? Call Your Broker," Fortune (Sep. 29, 1997), p. 153 (New York, NY). [This item was cited in a prior IDS, but the page citation was incorrect.].

C. Wilder, "Power Brokers Get On The Web," Information Week Online (Nov. 3, 1997), at www.informationweek.com/655/55iupow.htm (New York, NY).

C. Wolfram, "Strategic Bidding in a Multiunit Auction: an empirical analysis of bids to supply, etc.," RAND Journal of Economics (Winter 1998), vol. 29, No. 4, pp. 703-725.

"The Heyday of the Auction," The Economist (Jul. 24, 1999), pp. 67-68 (New York, NY).

C. Wolfram, "Electricity Markets: Should the Rest of the World Adopt the United Kingdom's Reforms?," Regulation (1999), vol. 22, No. 4, pp. 48-53.

J. Jurewitz, "California's Electricity Debacle: A Guided Tour," The Electricity Journal (May 2002), pp. 10-29 (Elsevier Science Inc.).

S. Hunt, "Making Competition Work in Electricity" (2002), pp. 355-369 and 395-402 (John Wiley & Sons, Inc., New York, NY).

"SoCal Gas Launching Internet-based 'Shopping Center' for Gas Services," Gas Utility Report (Oct. 10, 1997), p. 1 (The McGraw-Hill Cos.).

"COM/Electric Issues RFQ, Details Plans for Supply Auction; up to 973 MW in Play," Power Markets Week (Oct. 27, 1997), p. 7 (The McGraw-Hill Cos.).

L. Rodgers, "Energy Choice Via Internet—Gas Now, Power Later," Public Utilities Fortnightly (Feb. 1, 1998), p. 20 (Public Utilities Reports Inc., Vienna, VA).

"EUA Seeks Bids to Supply Customers Taking Mass., R.I. Standard Offers," Northeast Power Report (Mar. 13, 1998), p. 5 (The McGraw-Hill Cos.).

S. Holmes, et. al, "Auctions and Their Use in Natural Gas Markets," Office of Economic Policy Paper 98-09 (Oct. 1998), 36 pp. (Fed. Energy Regulatory Commission, Wash.,D.C.).

"FERC Staff Paper Poses Auction Concepts . . . for Consideration by Natural Gas Industry," Foster Natural Gas Report (Oct. 15, 1998), p. 1 (Foster Associates, Inc.).

"Duquesne & North American Power Brokers to Conduct Energy Auctions in PA over the Internet," Foster Electric Report (Jan. 20, 1999), p. 22 (Foster Associates, Inc.).

"Southern California Gas Allows Users to Solicit Energy over the Internet," Industrial Energy Bulletin (Feb. 5, 1999), p. 3 (The McGraw-Hill Cos.).

"Energy.com Serves Businesses with Launch of eBID, an On-line RFP System for Natural Gas and Electricity," PR Newswire (Jul. 6, 1999), (PR Newswire Assn.,Inc.).

L. Ruff, "New Electricity Trading Arrangements for England & Wales: A Comment by NERA on OFGEM's Proposals," Energy Regulation Brief (Aug. 1999), pp. 1-4 (NERA, London).

SCANA in JV with Mass. Firm to Offer Internet-based Auction Service, Energy Services & Telecom Report (Oct. 21, 1999), vol. 243, issue 20 (The McGraw-Hill Cos.).

C. Levesque, "On the Origin of the Markets: Electricity Evolution in the U.K.," Public Utilities Fortnightly (Jul. 15, 2001), (Public Utilities Reports Inc., Vienna, VA).

L. Ruff, "The Alberta Electricity Market: Structuring for Competition," Report to Canadian Competition Bureau (Mar. 6, 2002), pp. 15-22.

BIDDING FOR ENERGY SUPPLY

CROSS-REFERENCE TO RELATED APPLICATIONS

The present application is a continuation of co-pending U.S. application Ser. No. 10/633,937, filed Aug. 4, 2003, which is a continuation of U.S. application Ser. No. 10/062,798, filed Jan. 31, 2002, now abandoned which is a continuation of U.S. application Ser. No. 09/542,451 filed Apr. 4, 2000 (now U.S. Pat. No. 6,598,029 issued Jul. 22, 2003), which is a continuation-in-part of U.S. application Ser. No. 09/023,968 filed Feb. 13, 1998 (now U.S. Pat. No. 6,047,274 issued Apr. 4, 2000), which claims the benefit of U.S. Provisional application No. 60/039,041 filed Feb. 24, 1997 and U.S. Provisional application No. 60/064,421 filed Oct. 30, 1997.

BACKGROUND OF THE INVENTION

1. Field of the Invention

The invention is in the field of provision of energy supply, such as electric power and natural gas.

2. Description of the Background Art

The electric power and natural gas industries will experience fundamental changes over the next few years as the results of continuing deregulation take hold. One of those results is to give end users a choice of energy providers. Until now, substantially all end users purchased the electric power or natural gas they needed from the local electric or gas utility serving their geographic area. Electric utilities have generally operated as vertically integrated local monopolies, producing or purchasing (on a wholesale basis), the quantities of electric power they needed to serve all end users within the utility's geographic boundaries. Natural gas utilities have generally operated in a similar fashion, though usually purchasing rather than producing most of the natural gas they need.

According to the Federal Energy Information Administration, legislation to deregulate the electric power industry has been adopted in five states and is pending in over 20 others. In general, this legislation calls for a restructuring of the industry into at least three kinds of participants: (i) electric power generating companies, (ii) long-haul transmission companies, and (iii) local distribution companies ("DISCOs"). Power generators will include companies that own actual generating facilities as well as those firms that purchase generating capacity from others and market that available power directly to end users. Under most of the various legislative approaches, an end user will be given the opportunity to purchase its electric power from any legitimate power generating company willing to supply electric power to that end user's geographic region. One of the primary aims of electric power deregulation efforts nationwide is to reduce end user's energy prices by introducing competition among power generators. As competition increases, power generators are expected to offer prospective customers various pricing plans premised, for example, on volume and term commitments, and peak/off-peak usage. Under most of the pending deregulation schemes, the local distribution company facilities of the local electric utility will continue to be a government-regulated monopoly within the region it serves. These facilities are primarily the wires and other equipment constituting the local power grid over which electric power is transmitted to end user locations, having been delivered to the grid by generating plants within the local utility's service area or by other utilities' grids interfacing with that local utility's grid (when the local utility purchases electric power today from suppliers outside of its service area).

In the natural gas industry, similar deregulatory efforts are underway to enable greater competition and customer choice. The wholesale purchase and sale of natural gas has already been mostly deregulated. In some states large industrial and commercial customers can purchase their natural gas directly from gas producers rather than from the local gas utility. Most industry observers expect local natural gas utilities to be restructured in the near future to follow the model being used in the electric power industry as a result of deregulation, with three similar components: (i) natural gas production companies, (ii) gas pipeline transmission companies, and (iii) local distribution companies ("DISCOs"). Gas producers will include companies that own actual production facilities as well as these firms that purchase production capacity from others and market that available gas directly to end users. End users are expected to be given the opportunity to purchase the natural gas they need from any of numerous natural gas producers willing to supply natural gas to that end user's locale. Under most of the expected deregulation models, the local distribution company facilities of the local gas utility will continue to be a government-regulated monopoly within the region it serves. These facilities are primarily the pipelines and other equipment constituting the regional gas pipeline network through which natural gas is transported to end user locations, having been delivered to the regional network by production facilities within the local utility's service area or, more often, by long-haul gas pipeline transmission companies transporting natural gas from production facilities to the local utility's regional pipeline network.

Meter reading and billing of end users has until now generally been handled by the local distribution utility as part of its local franchise. As a result of deregulation, however, the local distribution utility is expected in many jurisdictions to lose this monopoly over meter reading and billing. The various state public utility commissions ("PUCs") in those states where electric power deregulation plans are at an advanced stage, for example, are considering giving power generators the right to read meters and render their own bills without the cooperation of the local distribution utility. In many cases, the power generator or end user may have the right to determine who will own the meter and whether the end user will receive separate bills (one for energy consumption from the power generator and another for the distribution and service charges of the local distribution utility) or a consolidated bill, as is the case today. Many industry experts expect independent service entities (not necessarily affiliated with, but acting as agents for, power generators or gas producers, local distribution utilities, end users, or any combination thereof) to provide meter reading and billing services on a more efficient basis than local electric and gas utilities do today.

Both electric and gas utilities rely primarily on meters at customer sites to apprise them of how much energy the customer has taken from the utility's supply lines running down the street. Many of these meters can measure (i) the volume of energy used (e.g., kilowatt-hours of electricity), (ii) the highest volume used during any hour throughout a monthly billing cycle (peak demand), and (iii) the volume used in every hour of the monthly billing cycle (or as short a period as every 15 minutes during this cycle). Some meters, such as those used by larger industrial and commercial end users, can measure all of the above. Other meters measure only total monthly volume and peak demand. Meters servicing residential customers often measure only total volume used during the month.

Today, most end users have meters that require a physical on-site visit by the local utility to read the meter in order to determine the end user's actual energy usage since the last time the meter was read. Typically, such on-site visits are made once a month. If the local utility fails to make such a visit, the end user's energy usage for that month is estimated and billed based on prior usage. Billing is then reconciled after the next on-site meter reading. More sophisticated meters now available enable the local utility to monitor the end user's actual energy usage electronically, without requiring a physical on-site visit to read the meter. Employing these meters, the local utility can continuously monitor the end user's actual energy usage by taking readings every 15 minutes throughout the day, if necessary. Some local electric utilities, for example, require their largest customers to install these electronic remotely-readable meters so that the utility can monitor these customers' actual usage throughout the day and, as a result, better manage and balance the overall load on its local power distribution grid. Industry experts expect meter manufacturers within a few years to reduce this monitoring window to under five minutes.

Whether the meter is read by an on-site visit or via remote communication, today the local utility records that energy usage data and applies its applicable tariffed rate to produce a bill for the end user. These tariffs, filed by the local utility with the applicable state PUC, set forth specific rates to be charged to different classes of customers—e.g., large industrial and commercial end users often pay rates based on peak demand as well as total volume consumed, whereas the rates paid by residential customers typically relate only to total volume consumed. Some tariffs call for different rates depending on time of use (e.g., peak v. off-peak pricing). In general, large customers pay lower rates than small customers. As deregulation progresses, competing energy providers are expected to offer end users myriad pricing plans and contractual arrangements geared to time of use, volume and term commitments, etc. Power generators will compete with other power generators just as gas producers will compete with other gas producers.

An active wholesale market exists for electric power. Power generators, local electric utilities, resellers, independent traders and brokers actively buy and sell electric power among themselves. A power generator may wish to sell excess generating capacity not required for its own operations or not contractually committed to any utility, or may need to purchase additional power to satisfy its generating commitments. A local electric utility may be selling excess generating capacity (from its own generating plants) or buying power from nearby utilities, resellers, traders or brokers to cover a shortfall in its own supply (e.g., during certain peak periods). Resellers and traders may be fulfilling take-or-pay or supply contracts they have with power generators, local utilities or each other or just buying or selling based on speculation about the future price of power in the spot market. Under deregulation, the local electric utility will no longer have a monopoly on selling power to end users. Power generators, other utilities, resellers, brokers and other power marketers will all be able to sell electric power directly to end users.

In the wholesale power market, buyers typically take title to the electric power they purchase at well-established interfaces or transfer points on a regional power grid (e.g., the Oregon-California border). In many cases, however, the purchase arrangement may call for title to be passed at some alternate point, such as (i) the point on the regional grid nearest the seller's generating facility or (ii) if the buyer is a local distribution utility, the point(s) on its local grid where the grid interfaces with the power grids of neighboring utilities. Before this power can be delivered to the buyer at the agreed transfer point, the seller must schedule a "contract path" for this power to travel from the seller's generating facility (or the point at which the seller is to take title if the seller purchased this power from another source) to the transfer point. The buyer must, in turn, schedule a transmission path from the transfer point to the buyer's own grid interface (if the buyer, for example, is a local distribution utility) or, if the buyer is reselling this power to another party, to a transfer point agreed to by such other party. Scheduling contract or transmission paths is usually coordinated through the regional grid controller(s) for the power grids over which this power is to be transmitted. The regional grid controller manages one or more local power grids, keeping demand on the combined grid in balance with available supply at all times. Generally, but not always, the affected power grids are those owned and controlled by the electric utilities whose service areas are situated between the source of this power and the transfer point. The charges for transmission of the purchased power to and from the point at which title is passed are normally borne by the seller and buyer, respectively.

In many states or geographic regions, local electric utilities have formed wholesale power pools in which they share power, as needed, with other members of the pool under arrangements and according to rules previously agreed to by all the members. In some of these power pools, the members' generating facilities and key portions of their respective power grids are placed under the control of a regional or pool controller who manages the continuous balancing of power being transmitted across these grids for greatest efficiency and at lowest cost to the members. The pool controller in some cases, for example, will advise the pool members on one day of the power he expects to need during each hour of the following day, in order to satisfy the projected aggregate demand on the pool's combined grid by the utilities' customers. Each member is invited to submit offers (quantities and prices) of the power it is willing to supply to the combined grid. Starting with the lowest-priced power first, the controller accepts such offers until he reaches the aggregate quantity he needs for each hour of the next day. Typically, the clearing price—the price of the last unit of power needed by the controller to meet his projected demand for each hour—is used to set the price that all suppliers for that hour will receive, notwithstanding that some of the accepted offers were at prices lower than the clearing price. This approach ensures an efficient but equitable least-cost wholesale pricing arrangement among the pool members.

As deregulation efforts have gained momentum in the electric power industry, similar pooling arrangements have been explored to make the wholesale market more efficient but also to give energy marketers not affiliated with a local utility a reasonable chance to compete. The California Public Utilities Commission, for example, has proposed a power exchange to which the three largest in-state electric utilities must sell all their generated power and from which they must also buy all the power they need for distribution to their end user customers. Other power generators, utilities, resellers, traders and brokers can also buy and sell power through this exchange. Each day the operator of the power exchange will assess the next day's power supply requirements for the three largest utilities' customers as well as all those of the other local utilities in California to be supplied power via the exchange. The operator will ask power generators, local utilities with generating capacity, resellers and traders (and any others willing to supply electric power to the exchange) to submit asking prices for specified quantities of power to be delivered to the California power grid during each hour of the next day.

Starting with the lowest-priced power first, the exchange operator will then match its assessed needs for power during each hour of the next day against the offered power until the operator has identified sufficient power supplies for each hour to meet its anticipated demand. The price at which this offered power is accepted by the exchange operator will be the purchase price payable to the power provider. The power exchange plans to publish these prices every day. Similar exchange or pooling arrangements are being studied by other state public utility commissions as part of their deregulation proceedings.

One of the primary objectives of deregulation is to reduce energy costs for end users by fostering competition among energy providers. Most electric power industry analysts, for example, assume that end users will only realize significant savings if they move to time-of-use pricing (e.g., peak v. off-peak). In many states, larger end users are already subject to different prices based on the cost to the local electric utility of supplying power during periods of peak demand across its service area. In general, the cost to providers of generating power during peak demand hours can be dramatically higher than at other times of the day. The greater efficiency of the wholesale market and increased visibility of wholesale prices is expected to influence the pricing plans that providers will be willing to offer end users, especially those end users who are willing to pay different prices based on (i) when during the day they typically need more or less power and/or (ii) whether they can alter their current power consumption patterns to conserve usage during the hours of highest demand within the local utility's service area.

An active wholesale market also exists for natural gas. Gas producers, local gas utilities, resellers, independent traders and brokers actively buy and sell natural gas among themselves. A gas producer may wish to sell excess production capacity not required for its own operations or not contractually committed to any utility or other party, or may need to purchase additional gas supplies to satisfy its production commitments. A local utility may be buying natural gas from producers, other utilities, resellers, traders or brokers to secure its necessary supplies or may be selling gas to many of these same parties if it has excess supplies. Resellers and traders may be fulfilling take-or-pay or supply contracts they have with gas producers, local utilities or each other or just buying or selling based on speculation about the future price of natural gas in the spot market. Gas producers, other utilities, resellers, brokers and other natural gas marketers will all be able to sell natural gas directly to end users under most deregulation models for the natural gas market.

In the wholesale natural gas market, buyers may take title to the gas they purchase at any of several possible transfer points from the gas production facilities to the interface between the long-haul transmission pipeline transporting the gas and the local utility's regional pipeline network. Scheduling transmission of newly purchased or sold gas is usually coordinated with the operator of the long-haul transmission pipeline expected to transport this gas to the buyer. The charges for transmission of the purchased gas to and from the point at which title is passed are normally borne by the seller and buyer, respectively.

SUMMARY OF THE INVENTION

The provision of electric power and natural gas to end users is dominated by fixed price arrangements set according to (i) orders promulgated by the federal or state governmental bodies regulating providers, (ii) tariffs filed with such governmental authorities by the providers, or (iii) contractual arrangements between providers and end users. However, because of technological and regulatory changes, the provision of these sources of energy is becoming more of a commodity, with competition between providers expected to increase dramatically in the next few years. The invention disclosed herein provides an auction service that will stimulate this competition and facilitate the consumer's ability (and that of resellers) to make economic choices between providers. In this method and system, providers supply energy (i.e., electric power or natural gas) to end users (or resellers) in accordance with economic incentives (e.g., lowest price) resulting from a bidding process between participating providers, administered by a bidding service entity through operation of a central processor, a computer referred to as a bidding moderator (the "Moderator"). The bidding process to supply electric power will be conducted separate and apart from the bidding process to supply natural gas. Power generators will compete only with other power generators. Gas producers will compete only with other gas producers. However, for ease of reference, power generators and gas producers are each referred to herein as "energy providers" or just "Providers." Through this auction, Providers will be apprised of the bids of competing Providers and have an opportunity to modify their bids accordingly.

Each of the Providers transmits to the Moderator the rate it is willing to charge (or other economic incentive it is willing to offer) for electric power or natural gas to be provided to an end user or group of end users (or a reseller or group of resellers), over some particular period of time. For purposes of this application, resellers can be Providers or buyers of energy supply. This "bid" may be lower than that Provider's established rate for any of several reasons (e.g., the Provider has excess generating or production capacity at that time). The Provider may, for example, also decide for capacity or competitive reasons to place different bids on energy to be provided, for example, to different end users at different times of day and at different destinations (e.g., with higher prices for electric power supplied during daily peak demand periods or for power delivered to destinations at greater distances from the Provider's power generation facilities). The Provider may change its bids as often as it likes as marketplace demands for energy change or in response to competitors' bidding activities.

The Moderator collects this bid information from all the Providers, sorts it according to the rules of the auction (e.g., sorting it among delivery destinations—such as the grid interfaces of local electric distribution companies serving end users), and may further process this bid information, for example, to select Providers for particular end users or resellers. This provider selection information may include, for example, a prioritization of the Provider selection in accordance with Providers' bids or the designation of a selected Provider or a default Provider. The Moderator then transmits selected portions of this information to a control computer associated with each end user or group of end users (or each reseller or group of resellers), as well as to participating Providers' energy network management centers. Each control computer gets the rate information and/or provider selection information from the Moderator that pertains to the end user or group of end users (or the reseller or group of resellers) with whom the control computer is associated. The Moderator gives each Provider bid information from other Providers for at least a portion of the end users (or resellers) in regard to which any Provider has submitted a bid.

A control computer may be operated by the Moderator, by an end user or reseller associated with a control computer (e.g., by the energy manager of a large industrial customer), or by the local energy distribution company that distributes energy to the end user associated with a control computer. For some end users, the Moderator will perform the functions of the control computer, perhaps using an adjunct computer to the Moderator.

From the list of all Providers providing bid information to the Moderator, each control computer (or the Moderator) can select those Providers from whom participating end users or resellers will be provided electric power or natural gas and can change that selection at any time. After each new bid is submitted by a Provider and is processed by the Moderator, the rate and/or provider selection data will be transmitted to the relevant control computers (or retained by the Moderator if the Moderator will perform the functions of the control computer, including selecting a Provider for each set of end users or resellers) and rate information will be distributed to some or all of the Providers in order to implement the auction. A Provider, for example, may not be interested in receiving the bids of other Providers who are not active in the same geographic regions. All Providers will have the opportunity thereafter to submit a lower or higher bid for any end user (or any reseller or group of resellers) or group of end users to whom they wish to supply electric power or natural gas.

The Moderator (or the control computer associated with a set of end users or resellers) collects end users' actual usage data from end users' meters and processes this data to create periodic usage reports to be transmitted to Providers. If meter readings are performed by the end user's DISCO or a third-party meter reading service entity rather than the Moderator, reports of such end user's actual energy usage can be collected by the DISCO or third-party service entity and transmitted to the Moderator for processing and subsequent transmission by the Moderator to the respective Provider. The Provider, as part of managing its available capacity, can adjust its bids, for example, to create more demand for its available capacity on a spot basis, resulting in incremental revenue for the Provider that would not be achievable otherwise. These periodic usage reports can also be transmitted by the Moderator or associated control computer to the applicable end users or resellers.

Each Provider of electric power manages its power generation and/or power provisioning activities (e.g., buying and selling power in the wholesale markets) in response to periodic reports of end users' actual usage transmitted by the Moderator (or applicable control computer) to the selected Provider. In response to such reports, this Provider can adjust its power generating or provisioning capacity to reflect higher or lower expected usage as these periodic reports are received throughout the day, month or year. Each selected Provider of natural gas manages its gas production and/or gas provisioning activities (e.g., buying and selling natural gas in the wholesale markets) in response to similar periodic reports of end users' actual usage transmitted by the Moderator (or applicable control computer) to such Provider.

The technology required to facilitate forward delivery transactions, in which a buyer and seller agree to the terms of a transaction today, for example, but schedule actual delivery for a future time, would be helpful to end users, resellers and Providers. The Moderator can facilitate such transactions by processing requests for end users or resellers (as buyers) for future energy supply or services to be delivered by Providers in the future. In order to provide the Moderator with sufficient information to process such a request, the buyer will enter the information describing the request on a software-derived template and transmit such information to the Moderator.

Through this bidding process, Providers can compete to supply electric power or natural gas to end users and resellers based on available capacity, delivery destinations, volume discounts, peak period requirements, etc. Providers can also manage their power generation, gas production and/or energy provisioning activities by adjusting their bids from time to time, depending on capacity utilization or other energy availability factors. And end users (and resellers) can easily make economic choices among competing Providers.

DETAILED DESCRIPTION OF THE INVENTION

Figure 1:
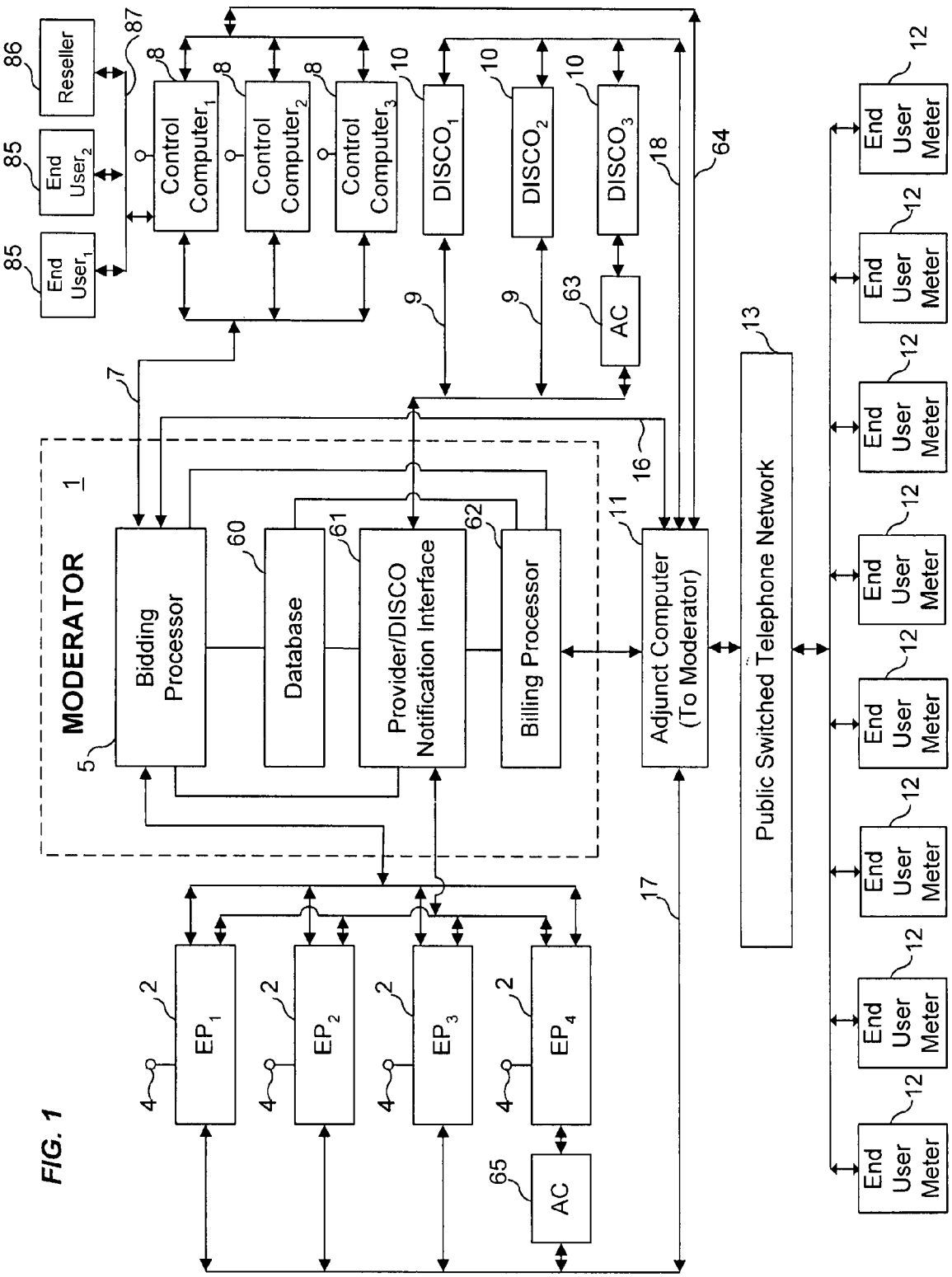
FIG. 1 is a schematic view of an exemplary system of the invention showing shared data links between the Providers and the Moderator, between the Moderator and the control computers, between the control computer and the end users (or resellers), between the Moderator and the DISCOs, between the Moderator's adjunct computer and the control computers, between the Moderator's adjunct computer and the DISCOs, and between the Moderator's adjunct computer and the Providers, and further showing dedicated communication lines between the Moderator and its adjunct computer, and the use of the public switched telephone network for communications between the Moderator's adjunct computer and end user meters.

The Energy Auction System ("EAS") can be made available to all end users of electric power or natural gas (and resellers of either), but will function best for those end users who have meters that can be read remotely by electronic means known in the industry (e.g., with access via public or private wired or wireless telecommunications facilities, coaxial cable facilities, power line communications access, etc., whether using circuit-switched, packet data, frame relay or asynchronous transfer mode networks or other communications facilities utilizing known technologies). An exemplary embodiment of the EAS system architecture is designed to operate as follows:

(i) Providers transmit their most economically advantageous rates (or other economic incentives) as bids to the Moderator;

(ii) the Moderator processes these bids according to specified rules of the auction to which all bidders agree, in order to produce an "apples-to-apples" comparison of the rates or other economic incentives offered by the bidders and, further, to generate provider selection data pertaining to each end user or group of end users (or each reseller or group of resellers) associated with a particular control computer;

(iii) the Moderator transmits back to the bidders some or all of the bids received from the other bidding Providers, giving them an opportunity to adjust some or all of their bids;

(iv) the Moderator transmits to each control computer such rate information and/or provider selection data as is relevant to the end user or group of end users (or resellers) associated with that control computer;

(v) using the information received from the Moderator, each control computer selects the Provider offering the lowest rate (or best economic value) at that time to the end users (or resellers) associated with that control computer (after applying any decision rules formulated and inputted by the control computer's administrator and/or formulated and transmitted to the applicable control computer by any end user or reseller) and transmits such selection to the Moderator;

(vi) for those end users or resellers not associated with a control computer, the Moderator will perform all of the functions the control computer would otherwise perform, including selecting the Provider offering the lowest rate (or best economic value) at that time to each such end user;

(vii) the Moderator (or applicable control computer) transmits a notification to the selected Provider (which may also specify the estimated energy requirements of the set of end users to be served) and, perhaps, copies of such notification to the end user's local energy distribution company ("DISCO") and to the respective Provider supplying power or natural gas to this end user immediately prior to the start of energy deliveries by the newly-selected Provider;

(viii) meters at subscribing end user sites periodically transmit reports of actual energy usage to the Moderator (or an associated adjunct computer), either directly or through the end user's DISCO or a third-party meter reading service entity;

(ix) the Moderator (or an associated adjunct computer) processes this meter reading data and transmits to the respective Provider (and, perhaps, also to the applicable end users or resellers) periodic reports of the actual energy used by each end user or selected group of end users (or by customers of a reseller) being supplied by that Provider;

(x) these usage reports may also be processed and transmitted by the Moderator to the DISCO (or an adjunct computer associated with the DISCO's power grid or gas pipeline management and/or billing systems) for each end user or group of end users (or resellers) in the service area being supplied by a specific Provider or for all end users (or resellers) in the aggregate (or any portion thereof) in that DISCO's service area, without necessarily sorting such end users (or by customers of a reseller) by their respective Providers;

(xi) based on such usage reports from the Moderator, each Provider can adjust the quantity of electric power or natural gas it supplies, by generation/production or otherwise, to the power grid or gas pipeline network, respectively, of the DISCO serving such end user or selected group of end users (or resellers);

(xii) applying the actual energy usage data received from each end user's meter and the rate (or other economic incentive) offered at the time by the winning bidder from among the participating Providers, the Moderator (or an associated adjunct computer) can prepare and transmit a billing statement for each end user or reseller to the respective Provider and to such end user or reseller (unless the Provider wishes to prepare its own billing statement for such end user); and (xiii) for those end users or resellers who so elect (assuming their selected Providers agree), the Moderator can prepare and transmit to each end user or reseller a consolidated billing statement, based on the actual energy usage data received by the Moderator from that end user's meter (or the meters of end users served by that reseller) during an entire billing cycle and the winning bid data relating to all selected Providers who supplied electric power or natural gas to this end user or reseller during that billing cycle (i.e., consolidating billable charges from all Providers of electric power to such end user or reseller on one bill and consolidating billable charges from all Providers of natural gas to such end user or reseller on another bill).

The Moderator (or applicable control computer) will, in most cases, transmit or make available to Providers (e.g., via an on-line bulletin board or Internet website) the estimated energy requirements of the end user or group of end users (or the reseller or group of resellers) to be served before the Moderator (or control computer) makes a selection of the Provider offering the lowest rate (or best economic value) at that time to the applicable end users or resellers, in order to give the Providers more precise data on which to base their bids.

Transmissions by Providers of bids to the Moderator, transmissions by the Moderator of processed bid data to relevant control computers and rate information to Providers, transmissions by control computers of Provider selection notifications to the Moderator, and transmissions by the Moderator of winning bid notifications to selected Providers (and, perhaps, to the relevant DISCO) can be made via data link, dedicated facility or any private or public wired or wireless telecommunications network. Similar means can be used for transmissions by end users' meters of usage data to the Moderator, for transmissions by the Moderator (or the applicable control computer) of the periodic energy usage reports derived from such meter reading data to the Providers, the end users (or resellers) and the applicable DISCOs, and for transmissions by the Moderator to the respective Provider of billing statements the Moderator prepares for each end user or reseller.

A control computer may be operated by the Moderator, by an end user or reseller associated with a control computer (e.g., by the energy manager of a large industrial customer), or by the DISCO that distributes energy to the end user associated with a control computer.

End users can participate in EAS even if they do not have meters that can be remotely read by electronic means. Such end users can have their meters read by on-site visits at the end of a billing cycle (or more frequently, if necessary) and have the meter reading data transmitted to the Moderator immediately thereafter (in lieu of having a remotely-readable meter transmitting periodic energy usage reports to the Moderator). Time-of-use meters will enable EAS to accommodate many Providers for an end user during the same billing cycle (e.g., peak v. off-peak usage), but switching to any new Providers before the end of the billing cycle will not be feasible, absent an on-site visit to read the end user's meter before making such a switch. End users who have meters that do not record actual energy consumed by time of use, for example, may achieve a rough approximation of time-of-use metering if participating Providers agree to bill for usage based on "usage profiling" (also referred to as "load profiling" in the electric power industry) for that customer (i.e., estimating the end user's actual energy usage hour-by-hour, using historical usage levels related to the class of customers into which this end user fits), an approach adopted by the California PUC as part of its electric power deregulation plans.

Bidding

The Moderator will establish rules and standards under which the auction process will be conducted. Some of those rules will be set to enable the Moderator to compare competing bids on an "apples-to-apples" basis, in order to determine the best economic value being offered to end users. Bids submitted to the Moderator must conform to such rules in order to be considered by the Moderator. The auction rules may take into account such factors as the difference in the nature of electric power generation and gas supply. For example, the supply of electric power must be controlled at the point of generation, while gas is capable of being stored, the transmission pipelines themselves constituting a significant storage medium.

In general, the Moderator may require bidders to formulate bids based on, for example, (i) a particular period of time during which they will supply energy (e.g., the next hour or the next 12 months), (ii) a specific end user (or reseller) or a group or class of end users (or resellers) to whom they will supply energy, (iii) a stated class of service they will supply (e.g., uninterruptible v. interruptible, high-voltage v. stepped-down service, etc.), (iv) whether they will supply 100% of an end user's (or reseller's) energy needs during a specified period or only supply up to a specific quantity of energy during a set period, (v) a specific delivery destination (e.g., a grid or pipeline interface of the end user's DISCO at which the DISCO will accept delivery of power or natural gas, respectively, from outside suppliers), (vi) the estimated amount of the energy required on a recurring basis by each applicable end user or set of end users (or resellers), (vii) the frequency with which the bidder will receive periodic feedback reports from the Moderator of actual energy usage by the end users to whom the bidder wishes to supply energy—a function primarily of whether the end users have remotely-readable meters sending usage reports to the Moderator on a recurring basis; and (viii) whether the end user (or reseller) will be billed separately for each Provider's energy or on a consolidated basis for all Providers supplying energy to such end user (or reseller) during the same billing cycle. A Provider may wish to formulate and submit more than one bid for an end user or group of end users or resellers (e.g., some end users may require more than one class of service, others may require that electric power or natural gas be delivered to more than one location, etc.).

The competing Providers bid for customers by transmitting to the Moderator the economic incentive each Provider will offer for supplying energy to different end users or groups of end users (or resellers). The economic incentive presently contemplated as being most usual is the rate (amount of money charged per unit of energy). However, many other kinds of economic incentive may be offered, such as a credit toward other services (e.g., frequent flyer points) or a credit toward an additional rebate that may be offered if a user's energy usage for a given period rises above a threshold. The economic incentive could be a combination of rate and another incentive. But the economic incentive should be selected from a limited set authorized by the Moderator, because the incentive must be capable of being evaluated by the software in the Moderator or its associated adjunct computer. Each bid is associated with a time period within which the bid will be effective.

The rules of the bidding process related to such time periods can be structured in many ways. The following are examples of such possible bidding rules:

(a) The day is divided into blocks of time by the Moderator and bids are submitted for each block of time. All bids for a given block of time must be submitted prior to a cut-off time that precedes that block of time by a protection interval. Any bid received after the cut-off time is considered to be effective for the next block of time, unless a new bid is subsequently received from the same Provider that would be applicable to the same end user or group of end users (or resellers). The protection interval applicable to bids to supply electric power, for example, is needed to permit all of the following actions to take place prior to the bid starting time: (i) processing of the bid information by the Moderator and transmission to the relevant control computer; (ii) selection of the winning bidder by the appropriate control computer and transmission of that selection back to the Moderator; (iii) the subsequent transmission of a selection notification to the selected Provider (or its associated adjunct computer) and, perhaps, to the DISCO serving the applicable end user or group of end users; and (iv) the scheduling of the power to be delivered by the selected Provider with the power grid controller(s) between the point of the Provider's generating facility (or the point at which the Provider takes title to any purchased power to be delivered to the end user) and the grid interface of the end user's DISCO. For example, if one hour blocks of time are auctioned, a 30 to 60 minute protection interval may be appropriate The protection interval applicable to bids to supply natural gas may be much longer due to the relatively slow speed at which natural gas can be transported (when compared to that for newly-generated electric power).

(b) Providers are permitted to submit bids for any time interval by specifying a start time and a termination time. However, no bid can be effective before a protection time interval specified by the bidding service provider. The Moderator provides confirmation of received bids back to the Provider if the data link from the Moderator to the Providers is provided with a selective messaging capability.

(c) Providers may be permitted to enter default bids for any block of time for which they transmit no other bid.

(d) As a fail-safe mechanism, to avoid use of old bids that have not been changed due to communication failure, the Moderator may impose a rule setting a time limit (a fail-safe protection time) to the applicability of any bid. At the expiration of the time limit, the expired bid could default to a preset default bid or to no bid. Such a rule could also be built into a Provider's adjunct computer to protect against a failure in the Moderator-to-Provider data link.

In formulating a bid, a Provider will typically need to know the location of the end user's facility to which energy will ultimately be delivered. More particularly, in most cases a Provider must know in which DISCO's service area the end user's facility is located and, perhaps, in which specific section of the DISCO's service area that facility is situated. Under most electric power deregulation efforts to date, for example, a Provider will be required to pay open access transmission fees to transport its power from its point of generation (or the point at which the Provider took title to the power, if it was purchased in the wholesale market) to the interface at which the end user's DISCO accepts power from outside suppliers. For the last leg of the transmission path, from the DISCO's outside interface to the specific section of the DISCO's power grid within which the end user is located, the provider will generally be required to pay a "retail wheeling" fee to the DISCO. This fee may vary depending on which specific section of the DISCO's power grid is the destination for the power to be delivered by the Provider. All of these transmission and wheeling charges would be expected to be incorporated in any bid submitted by a Provider to the Moderator. For end users with facilities at more than one location (and, perhaps, situated in different DISCOs' service areas), the Moderator can accommodate the submission of composite bids by Providers, formulated by the bidders to cover some or all of such locations.

To give bidders more precise data on which to base their bids, the Moderator can provide bidders with historical usage profile information for participating end users or groups of end users. The Moderator can update such historical information on a continuing basis to assure bidders they have current and reliable data. An end user who is a new subscriber to EAS may be required to furnish the Moderator with at least 30 days and as much as 24 months of historical usage data before the Moderator permits that end user to participate in the auction. Depending on the transmission and computer technologies used, transmissions by the Moderator (or the applicable control computer) to the Providers could also be accomplished by, for example, posting the historical usage profile information on an Internet website, bulletin board system or other similar facility, making them available for retrieval by all Providers.

The transmission of bidding data from the Moderator to each of the Providers is essential for the auction to function most effectively. This feedback permits the Providers to adjust their own bids for any particular end user or group of end users in view of other Providers' bids for that same end user or group. In a block of time bidding scheme, this transmission may take place, in different service offerings, either before or after the bid cutoff time for a given block of time. If transmitted before the cutoff time, the Providers have an opportunity, up to the cutoff time, to adjust their bids for that block of time. If the service is arranged for transmission of such data back to the Providers after the cutoff time, the Providers can adjust their bids for the next or subsequent blocks of time. If the bids are transmitted back to the Providers after the cutoff time but before the bid's effective time, the Providers would be able to manage their power generation, gas production and/or energy provisioning activities to take account of that time interval's bid structure. The bids can be adjusted to be higher or lower, depending on whether the Provider wishes to further encourage or discourage additional energy delivery commitments. The Provider may wish to reduce its bid, for example, to stimulate additional delivery commitments or increase its bid to discourage additional commitments. Depending on the transmission and computer technologies used, transmissions by the Moderator (or the applicable control computer) to the Providers could also be accomplished, for example, by posting the bids on an Internet website, bulletin board system or other similar facility, making them available for retrieval by all Providers.

Depending on the particular implementation of the auction, it may be appropriate to transmit all received bids to all Providers. However, each Provider's own bids need not always be transmitted back to it and there may be Providers who focus, for example, on certain delivery destinations or certain classes of end users (or resellers) and are not interested in seeing bids from Providers serving other delivery destinations or end users (or resellers). In any event, at least a portion of the bids are transmitted to at least a portion of the Providers in order to implement an auction.

The bid information being transmitted between the Moderator and the Providers is sensitive business information and may need, under various circumstances, to be encrypted. Depending on how the service is arranged, there may be a need to protect the privacy of bids from interception by other participating Providers or from interception by non-participating Providers. Some of the most sensitive information would be bid information sent from the Providers to the Moderator and bid confirmation messages from the Moderator to the Providers. Some less sensitive information would be the bids transmitted back to participating Providers after the cutoff time for a given block of time. There are several encryption schemes known in the art for such use, including the RSA and PGP schemes.

To reduce the exposure of end users to the potential volatility of prices offered via the auction, EAS will allow default Providers to participate. If, for example, prices bid in the auction rise above a fixed upset price previously agreed to by the default Provider, the relevant control computer (or the Moderator) will select the default Provider as the winning bidder. The Moderator may negotiate with one or more Providers to serve as default Providers for EAS. In the alternative, an end user or group of end users (or a reseller) may wish to specify to the Moderator that a particular Provider be designated as that end user's or reseller's default Provider (e.g., a Provider who has entered into a contract with the end user to supply a significant portion of that end user's electric power or natural gas needs outside of the auction process).

The Moderator can accommodate end users (and resellers) who wish to limit the group of Providers from whom the Moderator will evaluate bids when a Provider is to be selected to supply energy to such end users (or customers of such resellers). An end user (or reseller) may wish to instruct the Moderator (or the administrator of the control computer associated with such end user) that energy be supplied to that end user only by Providers specified by that end user (or reseller). The Moderator, in compliance with this instruction, would include the bids of only this set of specified Providers when generating provider selection data in regard to such end users. In the alternative, this instruction by the end user can also be implemented at the control computer associated with that end user.

EAS can also accommodate those end users or resellers who wish to employ a strategy of purchasing power or natural gas at the lower of the bid price in the auction or the price they agreed to pay a contract Provider under a term contract. This contract price would be transmitted by the end user or reseller to the Moderator (or the applicable control computer) and the Moderator (or control computer) would include this contract price among the bids it evaluates when generating provider selection data in regard to each such end user or reseller. If the contract price is lower than all of the other bids, the relevant control computer (or the Moderator) would select the contract Provider as the Provider of choice for that end user or reseller. If the contract price is higher than any of the other bids, the low bidder would be selected as the winning Provider. The contract price serves as a ceiling while the end user or reseller can still capture the benefit of low prices made available via the auction (e.g., at night when system-wide demands for power are lower than during peak daytime periods). To ensure that this end user or reseller can satisfy the volume commitments that would likely be part of any attractively-priced contract, the Moderator could enable this end user or reseller to designate from time to time (e.g., during certain peak demand daytime hours) that the contract price is to be treated as the low bid available to that end user or reseller at that time. At other times the Moderator will consider all bids submitted by other Providers as well as the contract price.

Most bidders participating in the auction would be expected to supply 100% of the electric power or natural gas needed by the end users for whom these bidders are selected as the current Provider. Some bidders, however, may wish to submit bids to supply a fixed quantity of power or natural gas to an end user or group of end users (or resellers) during a particular period of time, rather than commit to supply 100% of the power or natural gas this end user needs or actually consumes. The Moderator can accommodate this type of bid by prescribing standard units or blocks of power or natural gas that Providers can use when formulating such bids. The Moderator would consider such bids only for end users (or resellers) who wish to participate and only as part of an auction process in which the bids compared are those for identical units or blocks of power or natural gas. In the event that insufficient units or blocks of energy are offered, the Moderator could again rely on a default Provider, either for 100% of the end user's or reseller's energy requirements or only for the shortfall needed.

An end user or reseller could, under this approach, have more than one Provider delivering power or natural gas to its facilities (or those of a reseller's customers) during the same period of time. For example, a large end user with a need for 1000 kilowatts of power during every hour between 8:00 a.m. and 6:00 p.m., Monday through Friday, elects to participate in EPAS under the above unit or power block approach. Four Providers submit bids to supply (in order of the lowest-priced bids first) 600, 200, 200 and 500 kilowatts of power for the period between 9:00 a.m. and 10:00 a.m. each day. The relevant control computer (or the Moderator) selects the three Providers who bid 600, 200 and 200, respectively, on the basis of their low bids and the amount of power offered.

In another example of the auction using units or blocks of power or natural gas, the auction rules might specify that only one Provider (and, perhaps, a default Provider to cover any shortfall) will be selected for each end user or reseller from among those bidding to supply blocks of power. In that event, in order to make its selection of a Provider for each end user or reseller, the control computer (or the Moderator) would only consider bids to supply blocks of power or natural gas of sufficient size to fulfill 100% of the end user's or reseller's projected power or natural gas requirements or, at the election of the end user or reseller, some lesser quantity of power or natural gas previously specified by the end user or reseller, with the shortfall to be covered by the default Provider. Under a block bidding approach, the end user or reseller would likely be committed to a take-or-pay obligation with each of the partial Providers, including the default Provider covering any shortfall. Because electric power is fungible, as is natural gas, the end user's meter would not be able to distinguish whether the electric power or natural gas supplied by one Provider was consumed in its entirety while another Provider's supply was not. This unit or block approach would probably be practical only for those large users or resellers who can control with some precision how much power or natural gas they (or their end user customers, if a reseller) consume at any time or have highly predictable usage profiles on a recurring basis.

If a Provider is selected as the winning bidder, the Provider will be responsible to schedule the delivery of its power or natural gas to the end user's DISCO during the period stipulated. For example, such a selected Provider of electric power will notify the regional grid controllers of the utility grids between the provider's point of generation, and the grid interface of the end user's DISCO that the Provider intends to ship power over their power grids. The Provider will likely aggregate the quantity of power it needs to deliver to each DISCO for the Provider's end users in that DISCO's service area and arrange for its delivery as part of the same scheduling activity. Resellers, traders and brokers are constantly engaged today in scheduling power and natural gas deliveries as part of their routine daily activities in the wholesale electric power market.

Monitoring Usage—Feedback to Providers

Once the Provider has been selected, the Moderator (or applicable control computer) can monitor the actual energy consumed by each end user by collecting meter readings from the meter or meters at the end user's facilities. Most meters with remote reading capability today can transmit usage reports to the Moderator every 15 minutes, if necessary. Industry experts expect meters to be available soon that will enable almost continuous (i.e., near real time) reporting of energy consumption.

Depending on the type of end user or reseller and the needs of the Provider (and, perhaps, the end user's DISCO), the frequency at which actual usage reports should be fed back to the selected Provider or DISCO will vary. For example, very large users of electric power can create temporary imbalances in the local power grid and contribute to meaningful fluctuations in the aggregate amount of power required to be supplied by a selected Provider to meet the needs of all of its customers in a particular service area. The DISCO for that end user will also want to obtain timely usage information in order to manage such imbalances on its local grid effectively. Frequent meter readings would be desirable for this type of customer. On the other hand, residential customers as a group have fairly predictable usage profile patterns and would require much less frequent monitoring. The Moderator will process and transmit such actual usage reports at such frequencies as are specified in the auction rules, with reasonable exceptions accommodated at the request of the selected Provider or DISCO. In addition, to facilitate such end user's or reseller's energy management efforts, the Moderator (or applicable control computer) can also transmit actual energy usage data (with or without current information on bid prices) on a periodic basis back to the end user or reseller (to be received by the end user's meter or such other terminal equipment as the end user or reseller may designate) or, in the alternative, the Moderator (or applicable control computer) can transmit such data to an electronic mail address or Internet website designated by the end user or reseller.

When meter readings are received by the Moderator or applicable control computer, as the case may be, it will process the actual energy usage data collected, first sorting it by end user (and, if appropriate, by reseller) and then, perhaps, aggregating this data by Provider for each delivery destination this Provider serves. A delivery destination for power may be the grid interface at which the end user's DISCO accepts power from outside suppliers or the section of the power grid within the DISCO's service area in which the end user is located or at the grid interface designated by the reseller, if applicable. A delivery destination for natural gas may be the interface on its regional pipeline network at which it accepts natural gas from outside suppliers. The Moderator can then transmit to each Provider the applicable aggregated usage data (as well as usage data on individual end users or groups of end users or resellers) if the Provider so elects. Relying on this energy usage data, the Provider can determine whether to increase or decrease the aggregate amount of power or natural gas it delivers to each delivery destination. The more frequent the energy usage feedback from the Moderator, the more efficient the Provider can become, eventually optimizing its generating or production capacity and/or energy provisioning activities (i.e., its buying and selling of power or natural gas in the wholesale markets).

For those end users without remotely-readable meters, the Moderator will be unable to collect periodic reports of actual energy usage more often than once a month, typically, unless more frequent on-site visits are scheduled than is generally the practice in the industry today. Feedback from these reports, once they are processed by the Moderator, will be transmitted to the applicable Provider on the same monthly basis. As a result, Providers will be more limited in their ability to react in response to such feedback by adjusting the quantity of electric power or natural gas they supply at any time to the power grid or gas pipeline network, respectively, of the end user's DISCO. Providers will have fewer opportunities to make optional and efficient use of their generating or production capacity and/or energy provisioning activities. In contrast, if these end users were to install remotely-readable meters, the Moderator could collect meter readings once an hour (or more frequently, if desired) and feed back the processed data to the respective Provider shortly after receiving it, permitting Providers to make frequent adjustments in the amount of power or natural gas supplied, optimizing their capacity and provisioning activities on a continuing basis. End users with such remotely-readable meters should be more attractive customers for Providers and, as a result, realize economic benefits not offered to other end users.

As deregulation progresses, state PUCs will determine whether any DISCOs will retain their monopoly over meter reading. The California PUC has already indicated that electric power DISCOs in that state will lose their exclusive right to read end user's meters. It appears increasingly likely that most state PUCs will reach a similar conclusion in order to give new Providers a reasonable chance to compete with the incumbent utility (since, in most states, each DISCO will be affiliated with its own power generating entity as a direct competitor to other Providers). However, in those states in which DISCOs retain their meter-reading monopoly, the Moderator may arrange with the DISCO for periodic transmissions to the Moderator of actual energy usage data collected from the meter of each end user subscribing to EAS. In a similar fashion, in those states where the PUC will permit third-party meter reading service entities (independent of the DISCO or any of the Providers) to read end users' meters, the Moderator may arrange with this third-party service to obtain actual energy usage data for each EAS subscriber. In the alternative, the applicable DISCO or third-party meter reading service entity may transmit these periodic usage reports directly to the applicable Providers with copies, perhaps, transmitted to the Moderator.

In those jurisdictions where the DISCO does not read the meters of EAS subscribers, the Moderator can provide the DISCO with meaningful usage data feedback to enable the DISCO to manage its local power grid or gas pipeline network efficiently. The Moderator can process the meter reading data it receives from other sources (e.g., remotely-readable meters transmitting energy usage data directly to the Moderator or the applicable control computer or third-party meter reading services transmitting the results of their readings to the Moderator's adjunct computer) and transmit to the DISCO periodic reports of actual energy usage by each end user or group of end users (or resellers) in the DISCO's service area, sorted by their respective Providers. The Moderator may also transmit to the DISCO such energy usage data for all end users and/or resellers in the aggregate (or any portion thereof) in that DISCO's service area, without sorting such end users or resellers by their respective Providers.

Billing

Billing under this disclosed invention could be handled, for example, by one of three methods: (i) by the Moderator applying the historical bid data to the energy used by each end user or group of end users served by a reseller), as recorded by the meter of such end user, without necessarily requiring the participation of the end user's DISCO in the billing process, (ii) by the DISCO reporting the energy usage data of each end user to the Moderator (if the DISCO performs meter readings for end users who are EAS subscribers or customers of a reseller participating in EAS), and the Moderator then creating a bill by applying the appropriate bid rates to the quantities of energy used while those bids applied, sorted by the selected Providers, or (iii) by the Moderator supplying historical bid data to the DISCO's billing computer for the period coinciding with the end user's or reseller's billing cycle, and the DISCO's billing computer then creating a bill by applying the appropriate bid rates to the quantities of energy used while those bids applied, sorted by the selected Providers. A third-party meter reading service entity instead of the DISCO could collect energy usage data and transmit that usage data to the Moderator for the Moderator to create a bill for each end user or reseller. In the alternative, the third-party meter reading service could use the energy usage data it collects, together with the Moderator's historical bid data, to create such a bill.

Under one such method, the Moderator (or applicable control computer) will receive actual energy usage reports from each end user's meter on a periodic basis, as part of the Moderator's role as an intermediary between end users (or resellers) and Providers (and, perhaps to some extent, between end users and their local DISCO). These meter reading reports will provide the Moderator with the quantity of electric power or natural gas actually consumed by the end user during each period measured and recorded by the meter. Periods as short as 15 minutes (and even shorter in the future) can be measured by meters with time-of-use features. Such meters will enable the Moderator to determine the precise amount of power or natural gas supplied to an end user by each of many Providers during the same billing cycle. For end users without time-of-use meters today (i.e., many small businesses and most residential customers), the Moderator can employ usage profiling to estimate actual energy usage from period to period (e.g., hourly).

Bid information submitted by participating Providers to the Moderator in the course of the auction will be stored for a period of time by the Moderator in its database (or that of an associated adjunct computer). The Moderator will also record and store in its database the identity of the Provider(s) selected to supply power or natural gas to each end user or group of end users during any billing cycle.

With the relevant bid price of the selected Provider and the actual energy usage data for the period this Provider supplied power or natural gas to an end user (or to customers served by a reseller), the Moderator can prepare a billing statement for that end user (or reseller) and each of its Providers during a billing cycle. Interim statements, covering any period within the billing cycle, can also be prepared by the Moderator. Billing statements, whether for the entire billing cycle or any interim periods, can be transmitted by the Moderator to the end user (or reseller) or the applicable Provider (or an adjunct computer associated with the Provider's billing system).

Some Providers may wish to prepare and deliver their own billing statement for each end user or reseller, assuming the end user or reseller is willing to bear the inconvenience of multiple bills for electric power, for example, covering the same monthly billing cycle (i.e., if more than one Provider supplies power to this end user or reseller during that month). Using the energy usage data collected by the Moderator (or DISCO) for each end user (or group of end users served by a reseller) and transmitted periodically to the Provider, that Provider could apply its appropriate bid rate to such actual usage in order to render a bill for each such end user or reseller. As an alternative that most end users or resellers would likely find more palatable, the Moderator can install data links or electronic interfaces between such Providers' billing systems and the Moderator's billing computer, enabling each Provider to transmit billing information it prepared for each end user or reseller to the Moderator. After receiving such billing data from each Provider, the Moderator's billing computer can collate the Providers' data into a single integrated bill for the end user or reseller.

The end user's DISCO may continue basing its tariffed service charges to end users on the total quantity of power or natural gas consumed during the billing cycle and, for larger customers, the peak demand for power or natural gas from each customer. If the Moderator or applicable control computer (instead of the DISCO) is collecting actual usage data from end users' meters, the Moderator can transmit regular reports to the DISCO showing actual energy usage for any period measured by each end user's meter, including both the total energy consumed during the billing cycle (or such other period requested by the DISCO) and the peak demand for power or natural gas from the end user, on an average or absolute basis.

Under most states' deregulation plans, as described above, PUCs are expected to give Providers the right to read meters directly and not be required to depend on the local DISCO to perform this function. In addition, some states are expected to permit independent firms to provide meter reading and billing services to Providers, end users and DISCOs. The Moderator could collect actual energy usage reports from such third-party service entities and prepare billing statements for each end user or reseller and each of the selected Providers supplying power or natural gas to that end user (or the group of end users served by that reseller) during a billing cycle. Interim statements could also be prepared by the Moderator. In either case, the Moderator could transmit such billing statements to Providers, the end user or reseller and, if necessary, the end user's DISCO.

In any jurisdiction where the PUC or other regulatory authority permits the DISCO to retain the exclusive right to read end users' meters, the Moderator will arrange to receive the relevant meter reading data from the DISCO. To produce a billing statement for each end user and the applicable Provider, the Moderator can process the usage data received from the DISCO and match it up with the selected Providers' appropriate bid data stored in the Moderator's database. Again, the Moderator can transmit billing statements to the end user or reseller and each of the selected Providers. Such statements can cover the entire billing cycle or any interim period.

For the convenience of end users or resellers, the Moderator can prepare a billing statement that consolidates all of the end user's electric power or natural gas consumption (or, if for a reseller, covering all of the end users served by that reseller) for the billing cycle and all of the charges levied during that period by all of the selected Providers for that end user or reseller (i.e., with one bill for electric power and another for natural gas). Each Provider would receive from the Moderator only the portion of this billing statement that related to the power or natural gas supplied by that Provider.

To facilitate the entry of an end user or reseller (in either case a "Buyer") into a forward delivery transaction with a Provider (or a reseller of another Provider's energy supplies or services), the Moderator will accommodate requests for future energy supply or services (an "RFS") from a Buyer. A "forward delivery transaction" is a purchase transaction in which a Buyer and a Provider (or a reseller of another Provider's energy supplies or services) agree on all material terms of the transaction at the time that transaction is entered into, but delivery by the Provider of the energy supply or service purchased by the Buyer is scheduled for a future time. That future delivery may be set for any specific delivery time in the future (for example, seconds, minutes, hours, days, weeks, months or years, or any combination thereof, after the time the transaction was entered into by the parties). In the context of this application, "delivery" means the Provider has made available to the Buyer, either via a direct or indirect transmission by the Provider to an appropriate interface with the local energy grid or pipeline servicing the premises equipment of the Buyer (or, if the Buyer is a reseller, to the designated interface with the grid or pipeline serving the reseller's end user customers) or some other interface specified by the Buyer, such purchase having occurred at the time the terms of the transaction (under which delivery is being made) were agreed to by the Buyer and the Provider.

Figure 7:
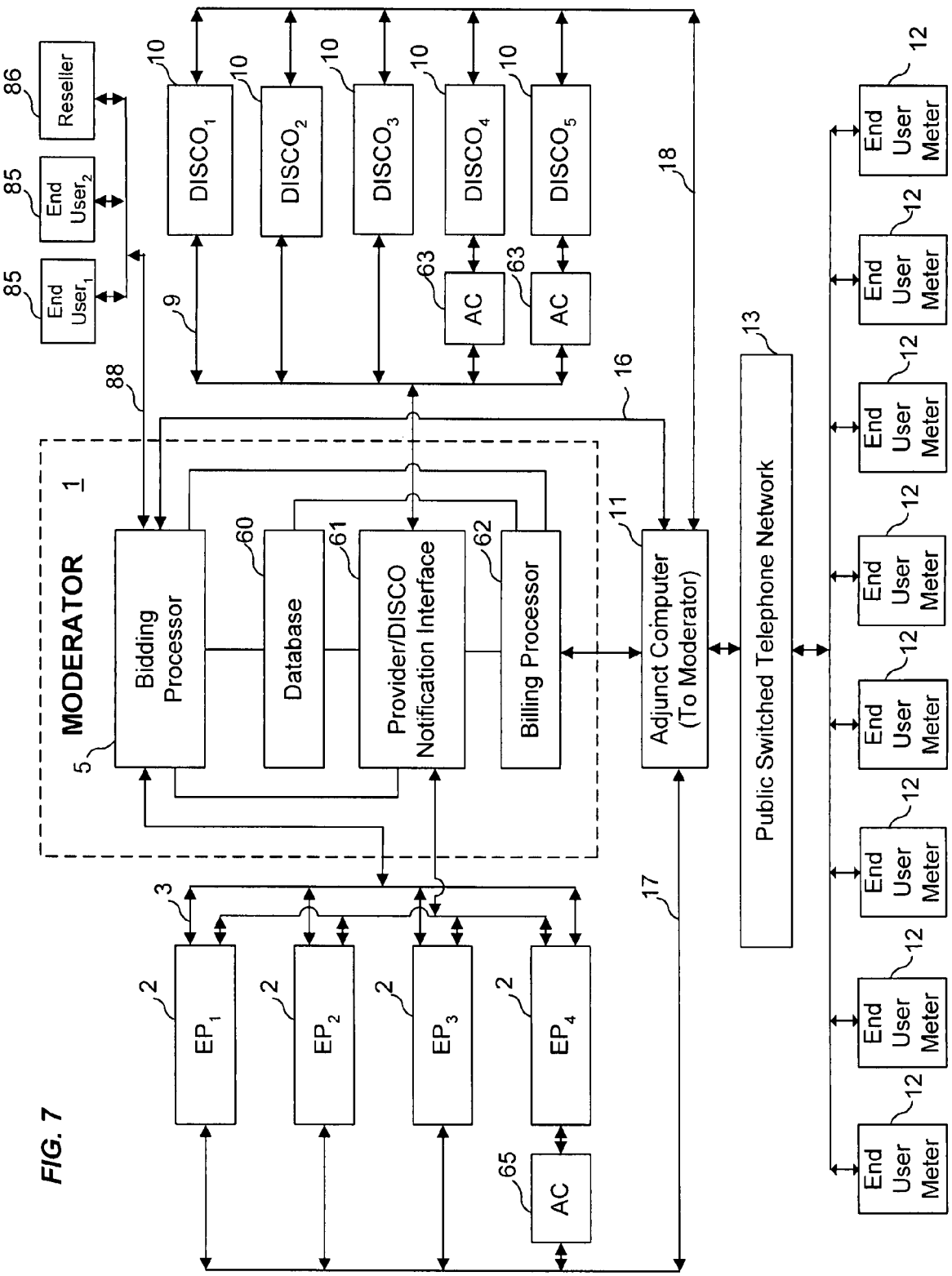
FIG. 7 is a schematic view of an exemplary system of the invention in which the Moderator selects Providers and incorporates all functions otherwise performed by the respective control computers as shown in FIG. 4.

FIGS. 1 and 7 illustrate exemplary systems for carrying out the herein disclosed forward delivery transaction process. A Buyer formulates an RFS and the Buyer's computer 85,86 transmits this RFS to the control computer 8 associated with this Buyer over a data link or other telecommunications facility 87, and from the control computer to the Moderator 1 over data link 7, as illustrated in FIG. 1. The Buyer's computer 85,86 can, in the alternative as illustrated in FIG. 7, transmit the RFS directly to the Moderator via data link 88 and the Moderator can incorporate any or all of the functions of the control computer. In order to provide the control computer and/or the Moderator with sufficient information to process the RFS, the Buyer enters the information describing the RFS on a software-derived template including, for example, the delivery destination of the energy to be supplied. This template may reside, for example, on a computer bulletin board or website maintained by the Moderator (or the applicable control computer) and accessible to Buyer.

The software-derived template may call for such things as: (i) the relevant future period for which service is being requested (e.g., one or more specific hours, days, weeks or months, or any combination thereof), (ii) the quantity of energy required (e.g., kilowatt hours, megawatt hours, cubic feet, etc.), (iii) any minimum quality criteria, (iv) the Buyer's load profile, perhaps with historical energy usage information, and/or (v) any other elements necessary to provide prospective Providers with a precise description of the future energy supplies or services the Buyer is requesting and the specific delivery criteria required by the Buyer.

In many cases, the Buyer may wish to include in the RFS the maximum price it is willing to pay a Provider for the energy supply or service requested (e.g., per kilowatt hour or megawatt hour of electricity or per cubic foot of gas, etc.). If the Buyer so specifies, the applicable control computer or the Moderator could use this maximum price as part of the selection process without necessarily disclosing it to prospective Providers. If no Providers submit RFS responses with prices at or below the Buyer's maximum price, the control computer or the Moderator could discard all of the responses and let the Buyer decide whether it will increase the maximum price and resubmit the RFS, it will abandon the RFS process altogether, or it will wait and resubmit the RFS again later with its previous maximum price. The Buyer could also be given the opportunity by the control computer or the Moderator to accept a price higher than the maximum price set by the Buyer as part of the RFS.

At any time prior to the Buyer's transmission of its RFS to the applicable control computer or the Moderator (or as part of such transmission) and/or the processing of the RFS by the control computer or the Moderator, the Buyer may transmit to the control computer or the Moderator a set of decision rules applicable to any particular RFS (or group of RFS's) or to every RFS submitted by the Buyer—to be applied by the control computer or the Moderator as part of the Provider selection process. For example, if the Buyer wishes to limit the group of Providers from whom it is willing to purchase energy, the Buyer can communicate that preference to the Moderator, either as part of the RFS transmission or as part of a previous transmission to the Moderator. In this event the Moderator will make the RFS information available only to that group of Providers preferred by the Buyer. Responses to the RFS from other Providers, if any are inadvertently received, will be discarded by the Moderator.

Once the applicable control computer or the Moderator receives the Buyer's RFS, the control computer or the Moderator further processes the information submitted and converts the RFS into a format that the Moderator can transmit to prospective Providers' computers or post on a computer bulletin board or website accessible by prospective Providers. This distribution or posting may occur immediately after the RFS has been received and processed by the control computer or the Moderator, or at some later time (e.g., according to a designated schedule each day). In most cases, we would expect that the Moderator would not reveal the identity of the Buyer to the prospective Providers while the RFS is pending. Those prospective Providers wishing to respond to the RFS will each formulate its response, enter it (for example) on a software-derived template (which could reside in one embodiment on a computer bulletin board or website maintained by Moderator and accessible by the Provider) and transmit it to the Moderator via data link or other shared or dedicated telecommunications facility.

Each Provider may be given the opportunity to limit the list of Buyers to whom the Provider is willing to sell energy supplies or services, and/or limit the energy supplies or services the Provider is willing to make available to any particular Buyer within one or more billing cycles (e.g., to reduce the Provider's credit exposure to that Buyer). The Moderator and/or each control computer can maintain each Provider's list of approved Buyers, with or without applicable credit or capacity limits. Updates can be transmitted by each Provider to the Moderator at periodic intervals. If, for any reason, the Buyer's identity is revealed in the RFS information disclosed to prospective Providers, each Provider can elect whether to respond to the RFS. If a Provider were to respond to that RFS, any previous credit or capacity limitations imposed by that Provider on that Buyer might be deemed set aside, at least for that RFS-related transaction.

The Moderator (or the applicable control computer) could also compare a Buyer's RFS information to data submitted to the Moderator by a prospective Provider before this RFS was distributed or posted, assuming the Provider had indicated, for example, its available energy supply and the price at which it would sell energy to any pre-approved Buyer. If such a Provider's available energy supply and pricing matched the requirements of a Buyer as specified in the Buyer's RFS, the Moderator (or control computer) could include this Provider as one of the respondents to the RFS, notwithstanding the fact that the Provider did not respond to the RFS after it was distributed or posted. As an alternative at some time in the future, if and when Providers become more comfortable posting data on their available energy supplies or services with the Moderator before an RFS is posted, the Moderator (or control computer) could use these pre-RFS submissions by Providers as the primary or exclusive source of responses to the RFS.

When the Moderator distributes or posts an RFS, prospective Providers will typically be given a deadline or cut-off time by which they must respond to the Moderator. Any responses received by the Moderator after the cut-off time will likely be discarded. From among the responses received on a timely basis, the applicable control computer or the Moderator selects the Provider offering the best economic value to the Buyer, after applying the Buyer's decision rules, if any, and any additional determination criteria governing like transactions and known beforehand by both Buyers and Providers (e.g., historical performance by each Provider, sufficiency of energy supplied by each Provider to the DISCO serving Buyers in that region, etc.).

To provide Buyers with the assurance that at least one Provider will be available to supply them with energy at a reasonable price, the control computer administrator or the Moderator may arrange for a default Provider from whom energy can be obtained under any of several scenarios (for example, if the prices offered by bidding Providers rise above a ceiling price specified by the Buyer).

The Buyer can also provide the applicable control computer or the Moderator with a decision rule that directs the control computer or the Moderator to select a particular Provider, regardless of how many other Providers respond to the Buyer's RFS or the attractiveness of the economic incentives they offer. This approach enables the Buyer to purchase its energy needs, for example, from a specific Provider with whom the Buyer may have an existing contract relationship pursuant to which the Buyer is committed to purchase from that Provider a certain volume or proportion of its energy needs. This decision rule may be operative based on one or more criteria, for example, time of day, quality criteria, destination, etc. In some cases, the Buyer may specify a decision rule that a certain Provider is to be selected unless prices offered by one or more other Providers are substantially better (e.g., 20% lower) than that offered by the otherwise preferred Provider. With this flexibility, the Buyer can take advantage of attractive prices and other benefits offered in the spot market without giving up the reliability and price stability offered by a term contract relationship with a primary Provider. The control computer or the Moderator could then choose the Buyer's primary term contract Provider as the selected Provider when appropriate under the decision rules set by Buyer.

Once the control computer or the Moderator selects a Provider to supply energy or services to a Buyer, the Buyer and that Provider are so notified by the control computer or the Moderator via electronic transmission. In most cases this may also be the point at which the selected Provider first learns the identity of the Buyer, unless the Buyer has given the control computer or the Moderator permission to reveal the Buyer's identity to the Providers as part of the RFS disclosure.

After the selection of the winning Provider has been made, the Moderator will transmit, to some or all of the Providers who respond to the RFS, at least some of the bidding data submitted by responding Providers (most likely without revealing the identity of the winning Provider or that of the Buyer). This feedback will enable the losing Providers to adjust their bids on the next RFS distributed to them by the Moderator.

If the Buyer and all of the prospective Providers (within the Buyer's preferred group of Providers) agree, or the rules under which the Moderator operates the bidding process so state and the Buyers and Providers still decide to participate, the Moderator could provide feedback to all bidding Providers of some or all of the prices bid by the different Providers in response to any RFS (most likely without revealing the identity of the winning Provider or that of the Buyer). This feedback would enable the Providers, while the bidding for a particular RFS is in progress and before a winner is selected, to adjust their bids and submit amended responses to the Moderator.

The Moderator (or the control computer) may also provide to the Buyer, before or after the Moderator (or control computer) selects the winning Provider, at least some of the bidding data from some or all of the Providers responding to the Buyer's RFS.

Once the Moderator (or control computer) has selected a winning Provider for the Buyer's RFS, the Moderator (or control computer) will transmit all or a portion of the transaction information to an Adjunct Computer via data link or other dedicated or shared telecommunications facility. This Adjunct Computer further processes the transaction information in order to process the energy usage data it receives from the meters of the end users to be supplied by this winning Provider.

This transmission of processed energy usage data can be initiated by a query from the Moderator or the applicable control computer to the Adjunct Computer or can be downloaded at periodic intervals by the Adjunct Computer to the Moderator or the control computer.

All of the functions of the Adjunct Computer can be performed by the Moderator, if use of an adjunct computer is not deemed advantageous for any reason.

The Moderator and/or the control computer can communicate with one or more adjunct computers, which each can communicate with one or more end user meters. In the alternative, the Moderator can communicate directly with one or more end user meters via a data link or other shared or dedicated telecommunications facility.

Different types of energy services (e.g., power quality and other ancillary services) as well as energy supplies may be provided by any Provider to any Buyer. The term "Provider" includes any seller or reseller of energy supply or services, regardless of whether that seller or reseller owns or operates any energy generation, production, transmission or distribution equipment or facilities.

References herein to "data links" or other shared or dedicated telecommunications facilities may, for example, include any wireline or wireless facilities, whether part of the public switched telephone network, private lines, the Internet, coaxial cable, electric utility power lines, Ethernet or other local area network (LAN), metropolitan area network (MAN) or wide area network (WAN) connections.

Some Buyers may elect to submit an RFS that includes more than one request for future energy supply of services, e.g., one RFS specifying several delivery destinations, each with the same or different (i) future periods for which energy supply or services are being requested, (ii) quantities of energy required, (iii) quality criteria, (iv) load profiles at each destination, and/or (v) additional energy services to be provided. This composite RFS may also be submitted, for example, for the same delivery destination, but for different future periods. The Buyer may specify a maximum price it is willing to pay a Provider for the composite of all the energy supplies and/or services it requests in the RFS, or it may specify separate maximum prices for each (or any other combination) of the elements included in this RFS. Once the control computer or the Moderator has selected a winning Provider for the Buyer's RFS, the Moderator will transmit (perhaps by way of one or more adjunct computers with data links to the applicable Providers) selection notifications to the one or more Providers from whom the Buyer will purchase the energy supplies or services posted in the RFS. The control computer or the Moderator can also transmit Provider selection notifications to the Buyer informing the Buyer of the winning Provider or Providers and any relevant transaction information.

To facilitate billing activity, the applicable control computer or the Moderator could transmit detailed information concerning actual energy usage for each Buyer to a Billing Computer immediately or at intervals specified by the administrator of the control computer, the Moderator or the Billing Computer, or by the Buyer or the selected Provider. This data, or billing reports derived therefrom, could thereafter be transmitted by the Billing Computer to the Buyer and/or the winning Provider via data link or other telecommunications facility. The functions of the Billing Computer could, as an alternative, be performed by the Moderator (or the applicable control computer). If billing for the particular purchase transaction entered into by the Buyer and the Provider does not require such detailed information (e.g., the Buyer purchased a set amount of energy supply for a certain future period, without regard to how many kilowatt hours are actually used), the Moderator (or control computer) could facilitate billing activity at any time (before or after the future delivery date specified as part of the transaction) and without receiving detailed energy usage data from the Buyer's meter. In this case, the Moderator (or control computer) would likely have all the relevant billing data as soon as the Buyer and Provider entered into this forward delivery purchase transaction.

DESCRIPTION OF FIGURES AND EXEMPLARY EMBODIMENTS

FIG. 1 shows an exemplary system for carrying out the herein disclosed auction process for the provision of electric power or natural gas to end users (or resellers) in which a Moderator 1 administers the collection and dissemination of bidding information. The Moderator 1 includes a computer with a processor and memory, together with input and output devices to communicate with the Providers' energy management computers 2, which are the source of the bidding information. By means of these systems, the Providers bid to become the selected Provider of electric power or natural gas for an end user or group of end users (or resellers). The Providers transmit their bids from their energy management computers 2 over data links 3, which may be either analog (using modems) or digital. However, the information is usually transmitted in digital form for input into the Moderator. Each Provider has an energy management administrator who enters energy management instructions into each energy management computer 2 through an input port 4 by means, for example, of a keyboard or a data link from a remote site or local computer. To give Providers more precise data on which to base their bids, the Moderator may transmit to Providers via data link some historical usage profile information for participating end users or groups of end users, particularly if an end user or reseller submits a request for future service to the Moderator for a substantial quantity of energy to be supplied in the future.

The Moderator 1 receives the bids, processes them in its bidding processor 5 to produce provider selection data, and enters both into a database in its memory by means of the data buses and registers internal to a computer. The bids are sorted according to delivery destination within the respective service areas of the DISCOs for subscribing end users. The Moderator 1 processes the bids to prioritize them for each delivery destination, producing derivative data, including provider selection data. This data can reflect, for example, designation of a selected Provider and alternate Providers, based on the Providers' bids to supply the power or natural gas requirements of each end user or group of end users (or resellers). The Moderator can also designate a default Provider in the event, for example, the Provider selected by the bidding process has no additional capacity available. The Moderator 1 transmits the derivative data over a data link 7 to a control computer 8 associated with the end user or set of end users (or resellers) for which the submitted bids are applicable.

Figure 10:
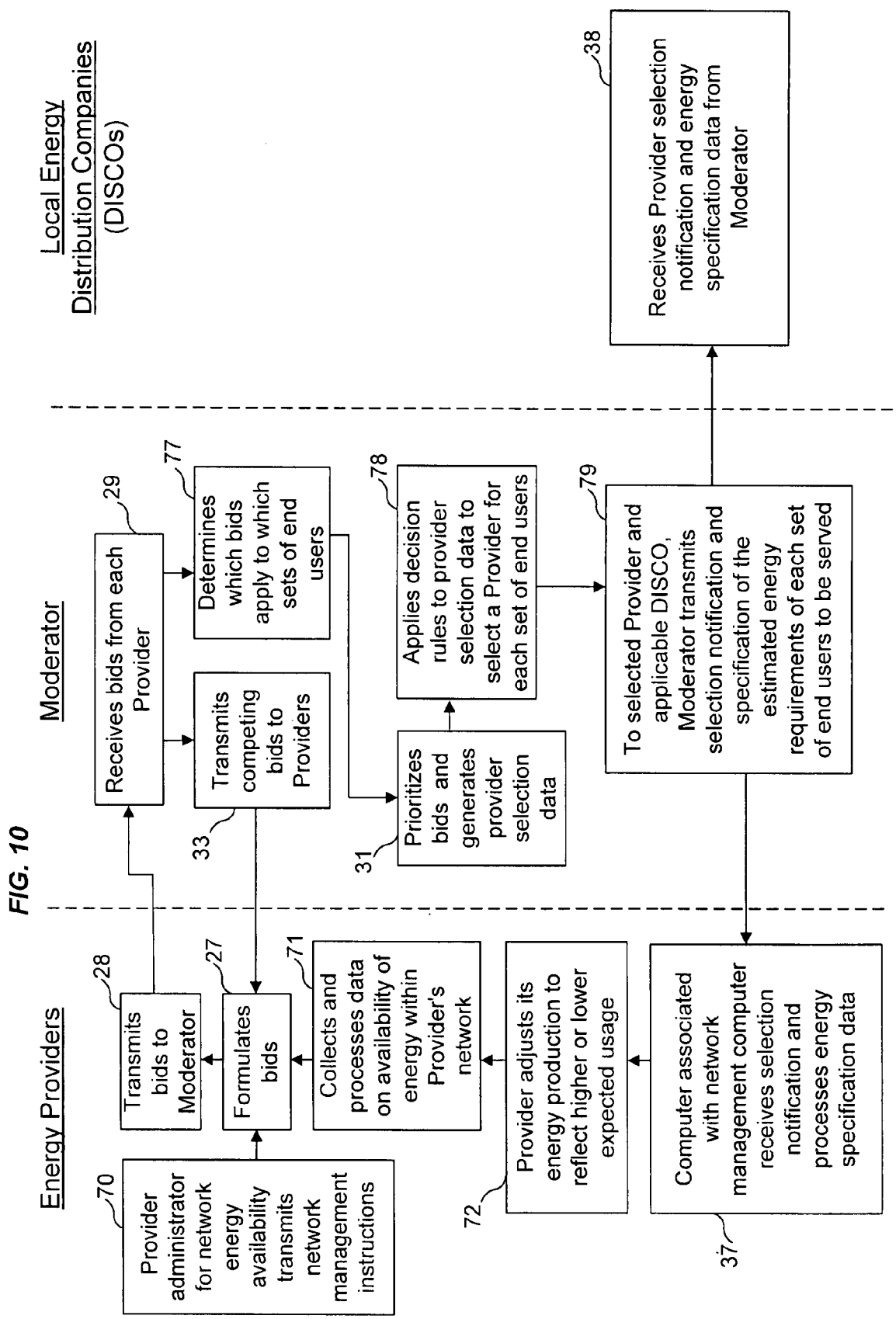
FIG. 10 is a schematic representation of an exemplary method of the invention in which the Moderator selects Providers for each set of end users and notifies the respective Providers and applicable DISCOs.

The control computer 8 can apply decision rules, formulated and inputted by the control computer's administrator (e.g., the energy manager for a very large end user), to the derivative data received from the Moderator 1 in order to select a Provider. A control computer may be operated by the end user or reseller, the end user's DISCO, or the Moderator (on behalf of the end users or resellers associated with that control computer). In many cases, end users or resellers may prefer to deal directly with the Moderator or may not wish to assume the additional expense, if any, arising from the installation or operation of a control computer. In that event, no control computer would be required. As illustrated in FIGS. 7 and 10, the Moderator can perform all the functions that the control computer would otherwise perform, including the selection of a Provider offering the lowest rate (or best economic incentive) at that time to each such end user or reseller.

As illustrated in FIG. 1, once the control computer 8 selects a Provider for an end user or set of end users (or resellers), it transmits a notification of that selection to the Moderator via data link 7, or perhaps via data bus if the control computer is being operated by the Moderator 1. The Moderator 1 then transmits via data link 3 a selection notification to the selected Provider 2 and a specification of the estimated energy requirements of the end user or set of end users (or resellers) to be served. The Moderator will also transmit via data link 9 a copy of such selection notification to the DISCO 10 serving the end user or applicable set of end users.

Figure 11:
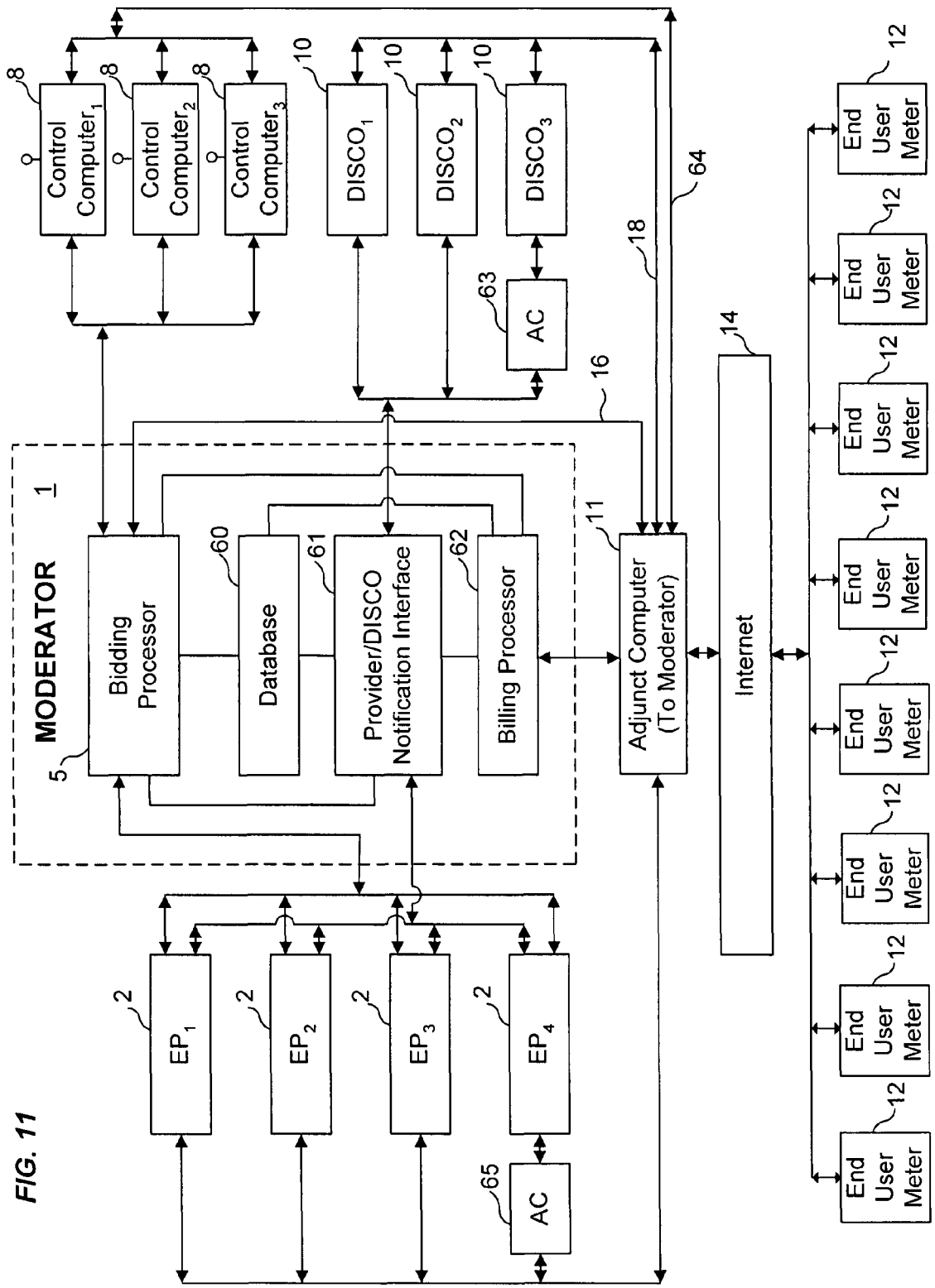
FIG. 11 is a schematic view of an exemplary system of the invention showing the use of the Internet for communications between the Moderator's adjunct computer and end user meters.
Figure 12:
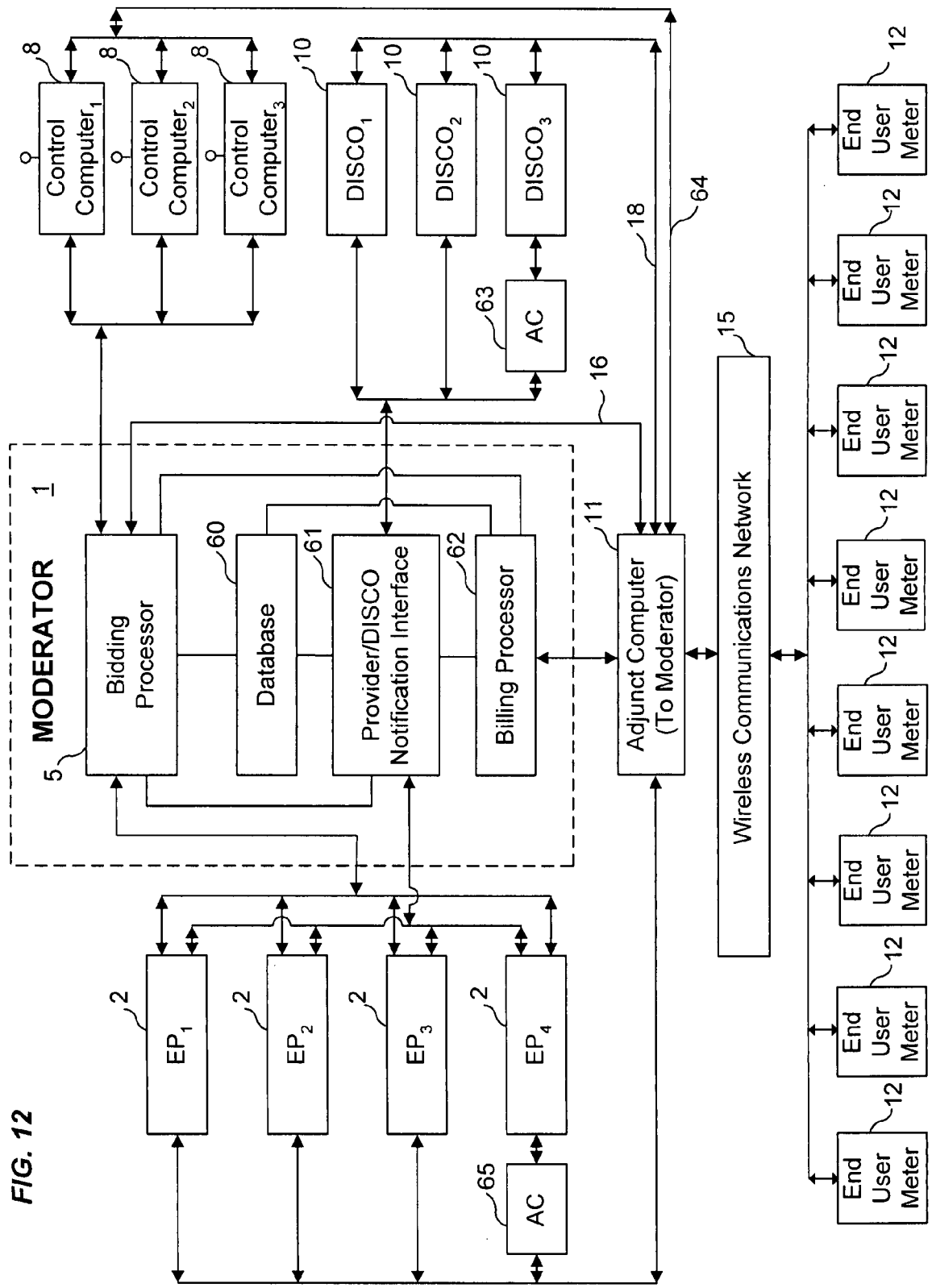
FIG. 12 is a schematic view of an exemplary system of the invention showing the use of a wireless communications network for communications between the Moderator's adjunct computer and end user meters.

The Moderator 1, perhaps using an adjunct computer 11, collects actual energy usage data from the end user's meters 12 via the public switched telephone network 13. As illustrated in FIGS. 11 and 12, however, end user meters 12 may communicate usage data to the Moderator's adjunct computer 11 via the Internet 14 (including posting such usage data to a website from which the Moderator's adjunct computer can download this data) or via a wireless communication network 15. Other networks, such as wide-area data networks or the communications facilities of a DISCO's local power grid, can also be used.

An adjunct computer is known in the art to be a computer, closely associated with a primary computer, that provides the primary computer's operating software additional data or operating logic to provide the primary computer with additional operational capability. In the herein disclosed architecture, an adjunct computer 11 can be employed, for example, to collect energy usage data from end users' meters 12, process that data and transmit such processed data to the Moderator 1, each end user's current Provider 2 and the power grid or gas pipeline management computer and/or billing computer of that end user's DISCO 10. The adjunct computer 11 communicates with the Moderator 1 over a digital data link or data bus 16. If the Moderator has enough processing capacity, the function of the adjunct computer may be incorporated in the Moderator's processor and memory, the function being implemented in the processor by appropriate software. The data link 16 is illustrated as a dedicated transmission facility between the Moderator 1 and the adjunct computer 11. However, any other transmission technology offering a selective way to transmit data from the Moderator 1 to the adjunct computer 11 may be used. (A "transmission facility" is a telecommunication path or channel. It may be, for example, a wired link, a radio channel in a wireless system, or a time slot in a digitally multiplexed optical transmission system).

A computer adjunct to the computer system used by a Provider and/or a DISCO to record and store the meter reading data for all of the Provider's and/or DISCO's end user customers (or perhaps belonging to an independent meter reading service entity performing this function in place of the DISCO) can also be employed to receive from the Moderator 1 or its adjunct computer 11, via data link 17, 18, the meter reading data measured by each end user's meter 12.

The Moderator 1 also transmits at least a portion of the received bids to the energy network management computers 2 (or associated adjunct computers) of Providers over data links 3. There are many transmission technologies available to transmit this bid data to the Providers, including dedicated bidirectional links between the Moderator and each Provider.

The data inputs and outputs of the Moderator 1, the control computers 8, the various adjunct computers, the energy network management computers 2, the end users' meters 12 and the DISCO's power grid or gas pipeline management and/or billing computers 10 are implemented by such devices as interfaces, registers and modems that are well known in the art.

Figure 2:
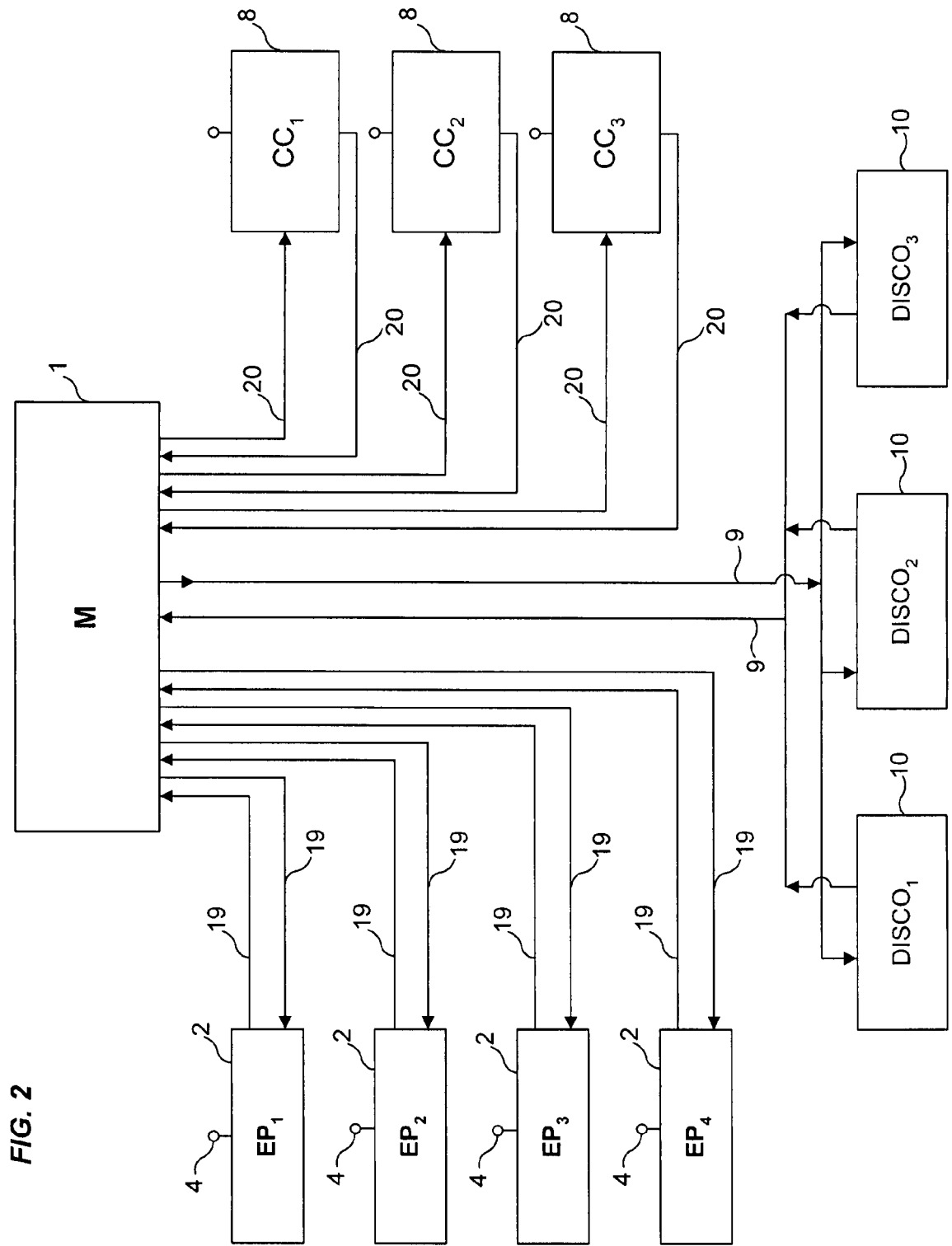
FIG. 2 is a schematic view of an exemplary system of the invention showing dedicated communication lines between the Provider and the Moderator and between the Moderator and the control computers, and a shared data link between the Moderator and the DISCOs.

FIG. 2 illustrates a system architecture in which the Providers' energy management computers 2 submit bids and receive data transmissions from the Moderator 1 over dedicated communications links 19. The control computer 8 receives rate information and/or provider selection data and transmits Provider selection notifications to the Moderator 1 over dedicated data links 20. The Moderator can transmit such a notification to the applicable Provider 2 over dedicated link 19 and to the applicable DISCO's power grid or pipeline management and/or billing computer 10 over shared data link 9.

Figure 3:
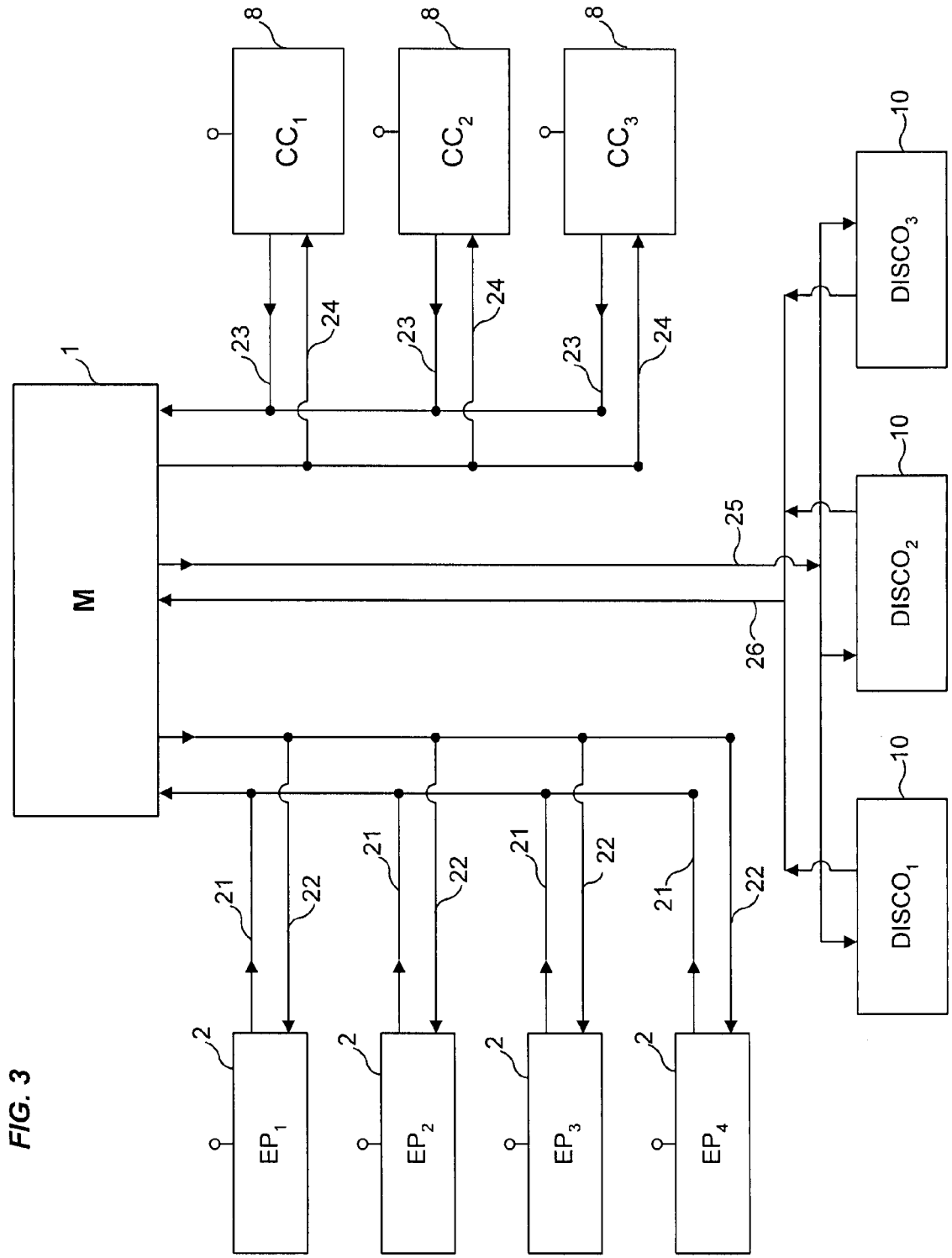
FIG. 3 is a schematic view of an exemplary system of the invention showing shared data links between the Provider and the Moderator, between the Moderator and the control computers, and between the Moderator and the DISCOs.

FIG. 3 illustrates a system architecture in which data communications between the Moderator 1 and the Providers 2, between the Moderator and the control computers 8, and between the Moderator and the DISCOs 10 are carried over shared data links 21, 22, 23, 24, 25, 26 in each respective case. This could be accomplished, for example, by many known local area network (LAN), metropolitan area network (MAN), and wide area network (WAN) technologies.

Figure 4:
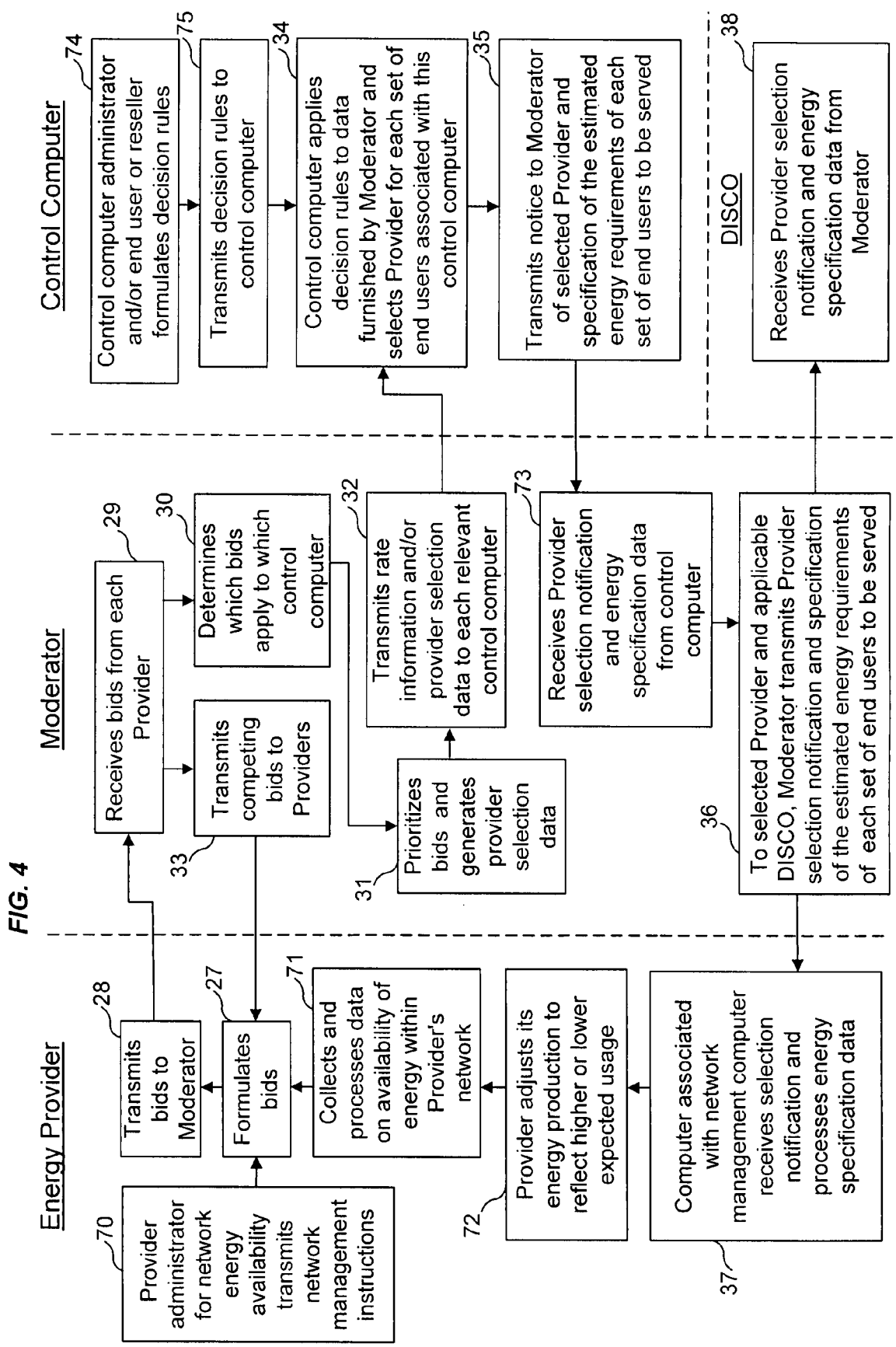
FIG. 4 is a schematic representation of an exemplary method of the invention showing transmission of bids by Providers to the Moderator, processing of bids by the Moderator and transmission of Provider selection data to the control computers, selection of Providers by the respective control computers and transmission of selection notifications to the Moderator, and transmission of such notifications by the Moderator to the selected Providers and the applicable DISCOs.

FIG. 4 illustrates an exemplary method of the herein disclosed invention in which Providers formulate bids and transmit these bids 28 to the Moderator. Upon receiving such bids 29, the Moderator processes the bids to determine which bids apply to which set of end users associated with each control computer 30, prioritizes the bids by, for example, listing the lowest bid first (and then the next lowest and so on) and generates provider selection data 31. The Moderator then transmits 32 rate information and/or provider selection data to each applicable control computer. After some initial processing of the bids received, the Moderator also transmits 33 at least a portion of the received bid information to competing Providers.

The control computer receives from the Moderator the rate information and/or provider selection data, applies decision rules, if any, that the control computer administrator has inputted, and selects 34 a Provider for each set of end users this control computer serves. The control computer transmits 35 to the Moderator a notification identifying the Provider that has been selected, together with a specification of the estimated energy requirements for the set of end users this Provider will supply. The Moderator, in turn, will transmit 36 this information to a computer 37 associated with the selected Provider's energy network management computer and, perhaps, to the power grid or gas pipeline management and/or billing computer 38 of the DISCO that serves as the local energy distribution company for the set of end users to be supplied by the selected Provider.

Figure 5:
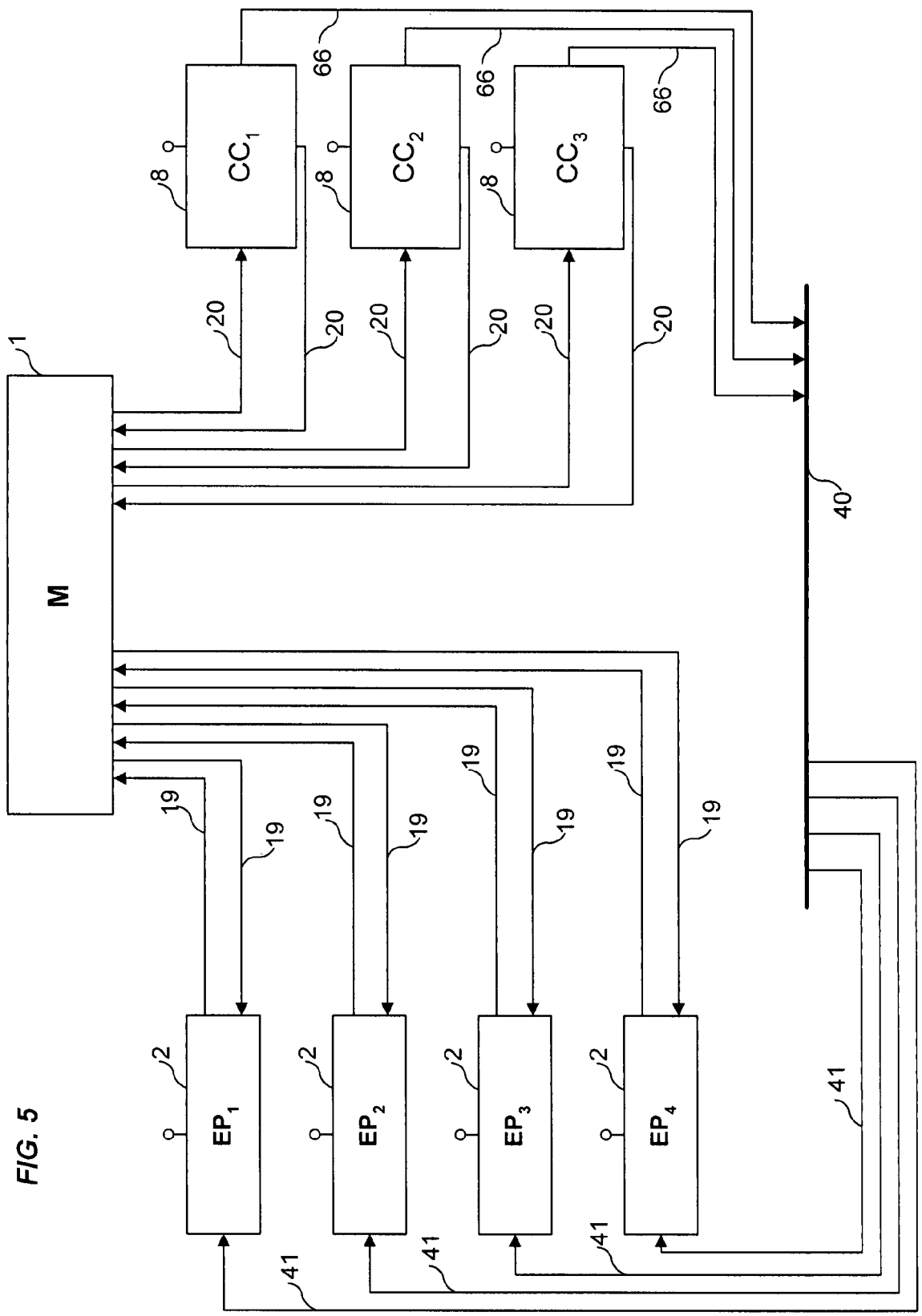
FIG. 5 is a schematic view of an exemplary system of the invention in which the control computers transmit selection notifications directly to the selected Providers.
Figure 6:
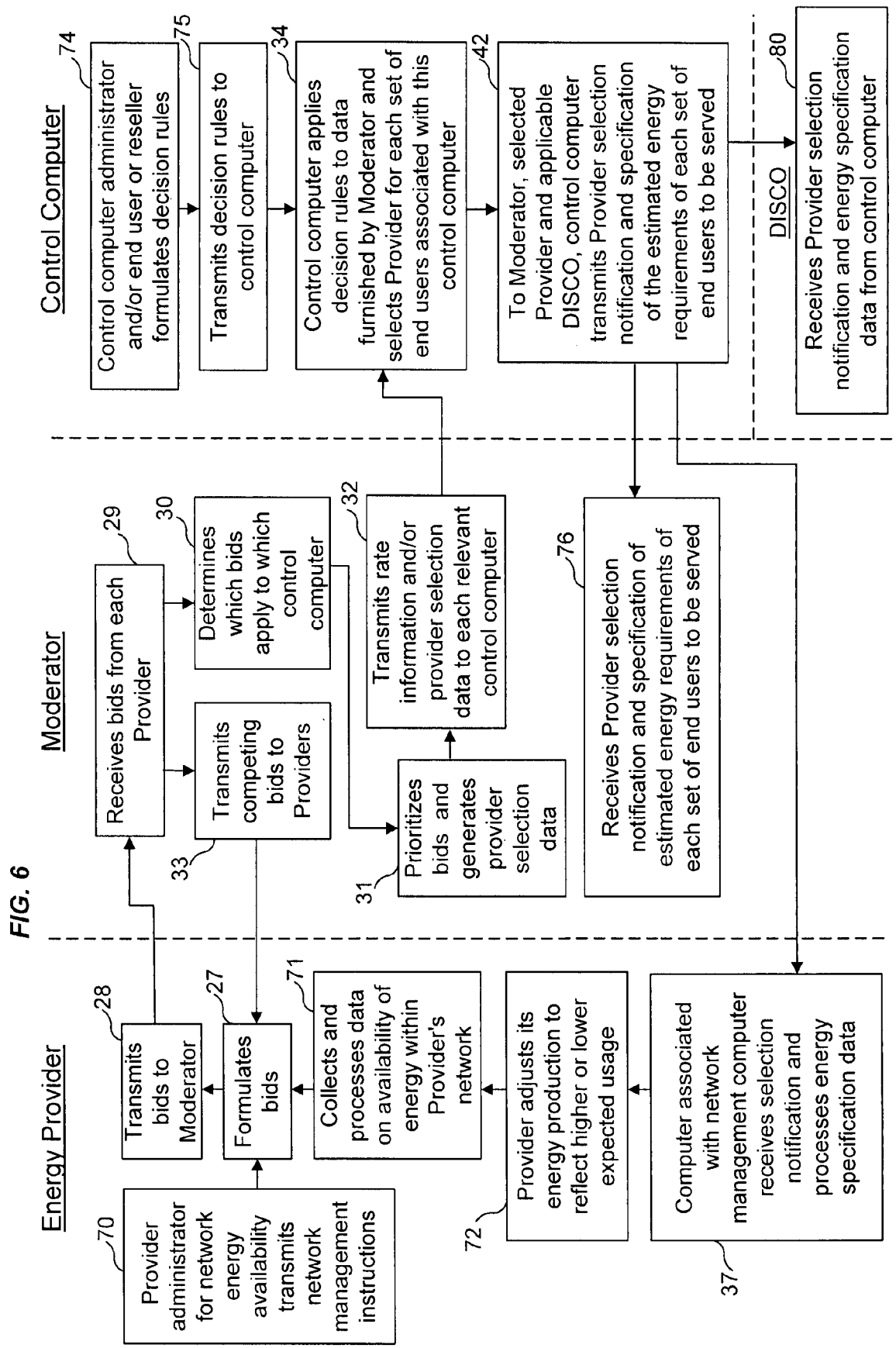
FIG. 6 is a schematic representation of an exemplary method of the invention in which the control computers select Providers and transmit notifications to the Moderator, the selected Providers and the applicable DISCO.

FIGS. 5 and 6 illustrate an exemplary system and method of the invention in which the control computers 8 transmit Provider selection notifications and specifications of estimated energy requirements directly to the selected Providers via data links 39 over an appropriate transmission system 40, 41 to each Provider 2. FIG. 6 also shows that the control computer may transmit 42 Provider selection notifications and energy specification data directly to the applicable DISCOs as well.

Figure 8:
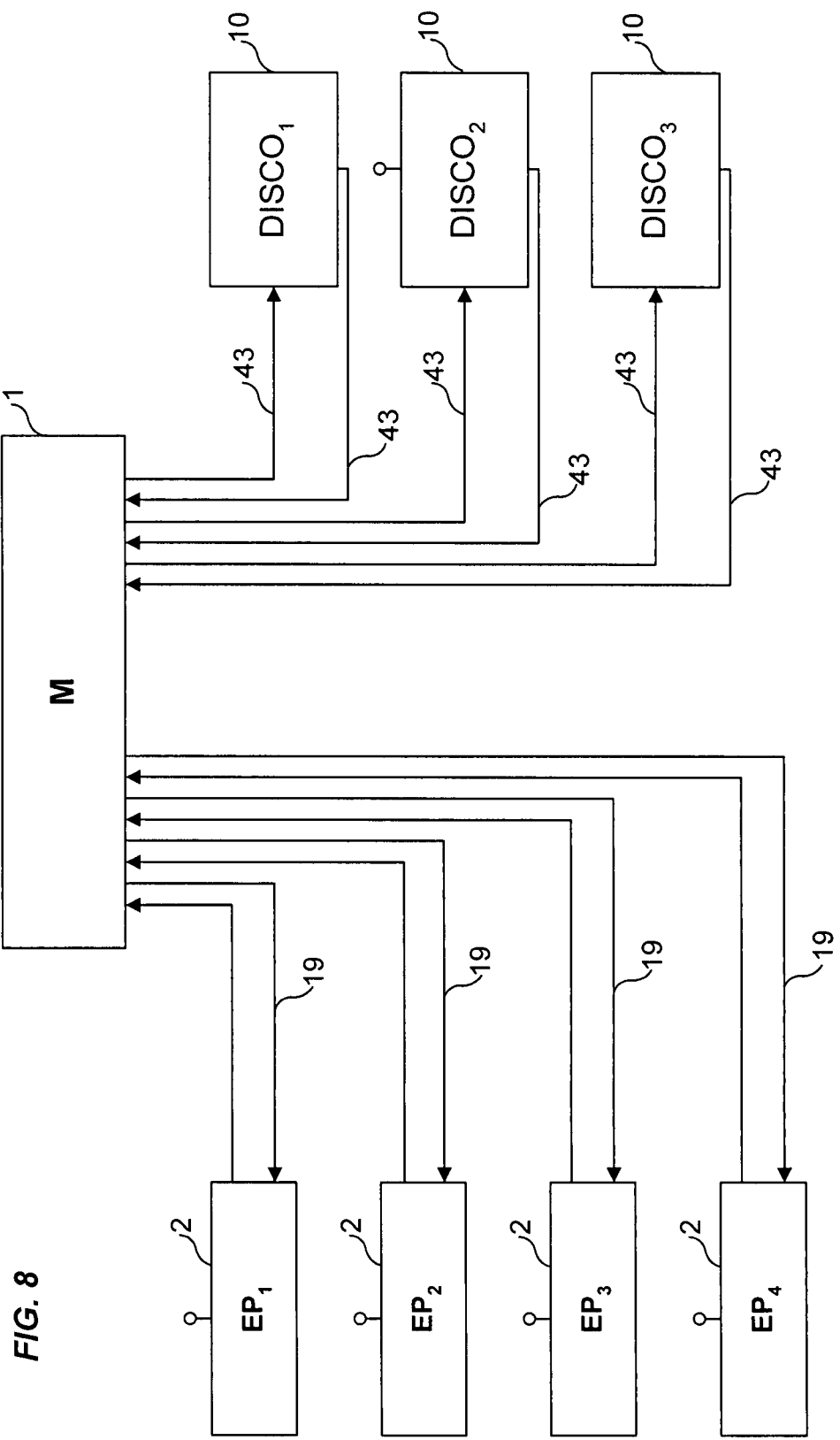
FIG. 8 is a schematic view of an exemplary system of the invention in which the Moderator selects Providers for each set of end users and communicates with all of the Providers and the DISCOs via dedicated communication lines.
Figure 9:
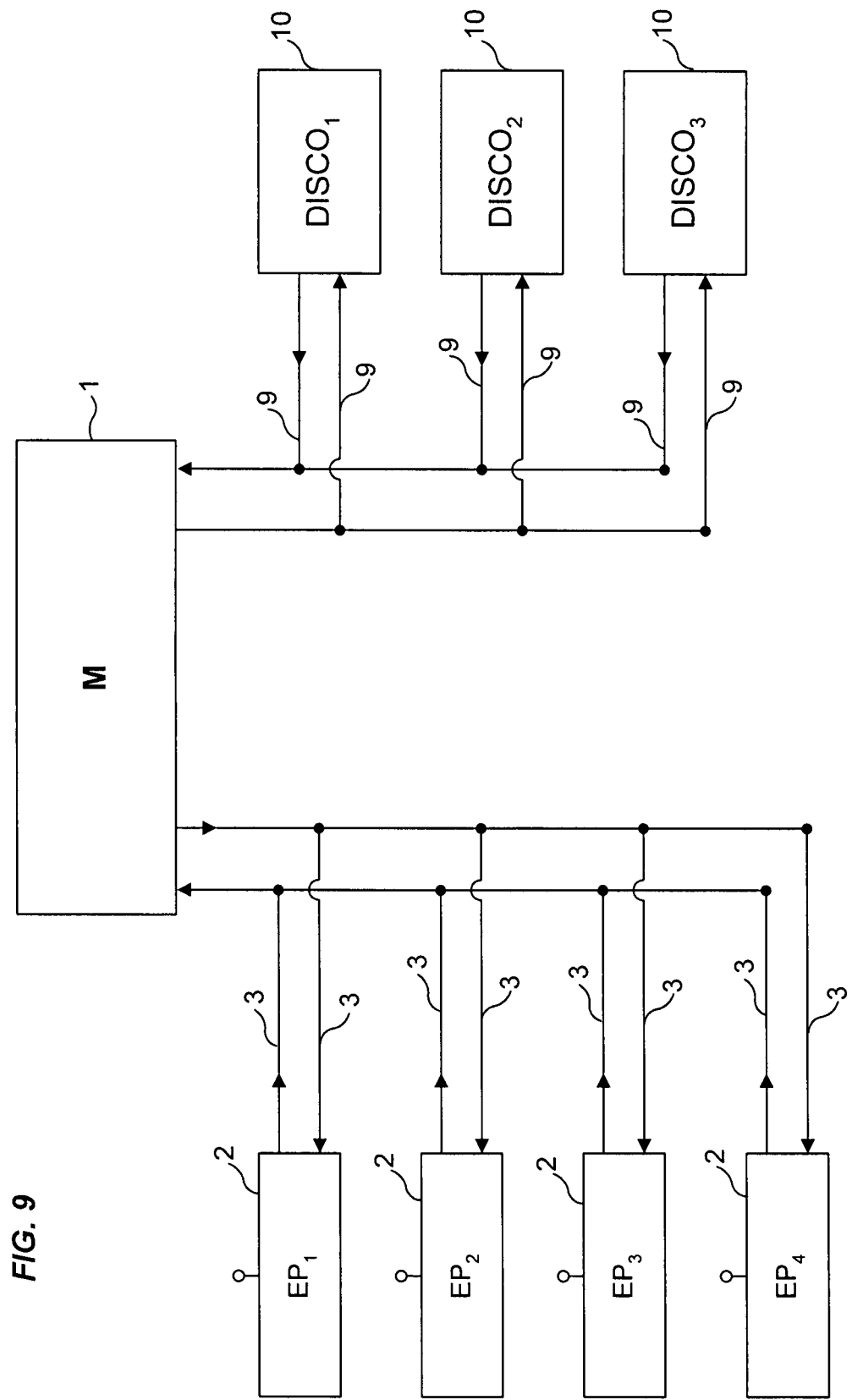
FIG. 9 is a schematic view of an exemplary system of the invention in which the Moderator selects Providers for each set of end users and communicates with all of the Providers and the DISCOs via shared data links.

FIGS. 7, 8, 9 and 10 illustrate an exemplary system and method of the invention in which the Moderator 1 incorporates all of the functions of the control computers. As a result, no control computers are needed in this system architecture. The Moderator selects the Provider for each end user or set of end users (or resellers), as illustrated in FIG. 10. The Moderator then notifies the selected Provider and the applicable DISCO of this Provider selection and transmits to the selected Provider and the applicable DISCO energy specification data for each end user or set of end users to be served. In FIG. 7, shared data links are used for communication between the Moderator and the end users (or resellers). In FIG. 8, the Moderator communicates with Providers and DISCOs via dedicated data links 19 and 43, respectively. In FIG. 9, shared data links 3 and 9 are used for communication between the Moderator 1 and the Providers and between the Moderator 1 and the DISCO 10.

Figure 13:
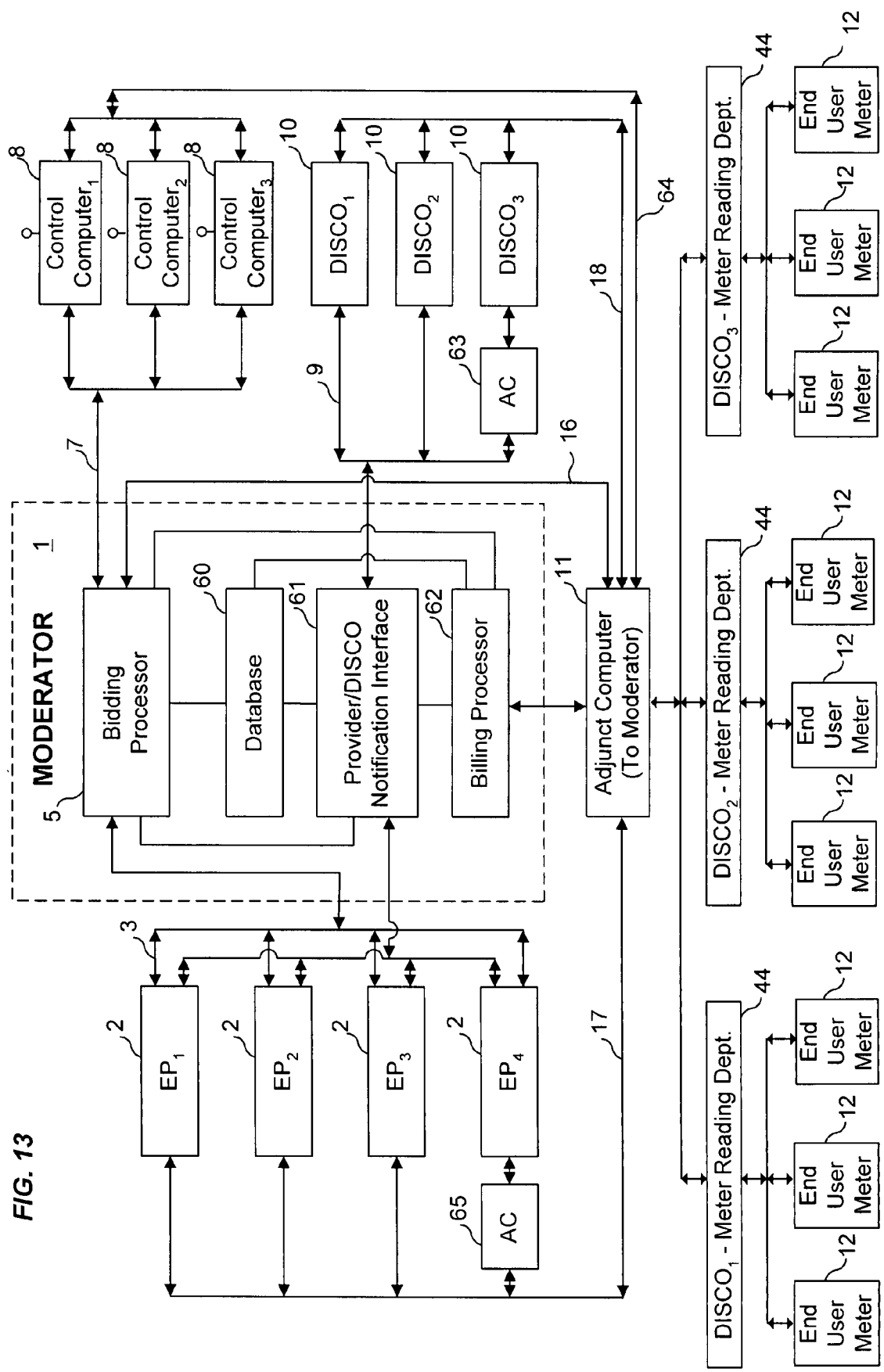
FIG. 13 is a schematic view of an exemplary system of the invention showing the applicable DISCO for each set of end users collecting the meter reading data from the meters of end users participating in the auction service and transmitting such meter reading data to the Moderator's adjunct computer.

FIG. 13 illustrates an exemplary system of the invention in which energy usage is collected from end user meters 12 by the meter reading department 44 of the DISCO serving as the local energy distribution company for such end users. Transmission of such collected meter reading data by the DISCO to the Moderator's adjunct computer 11 may be accomplished by any of several wired or wireless telecommunications technologies well known in the art.

Figure 14:
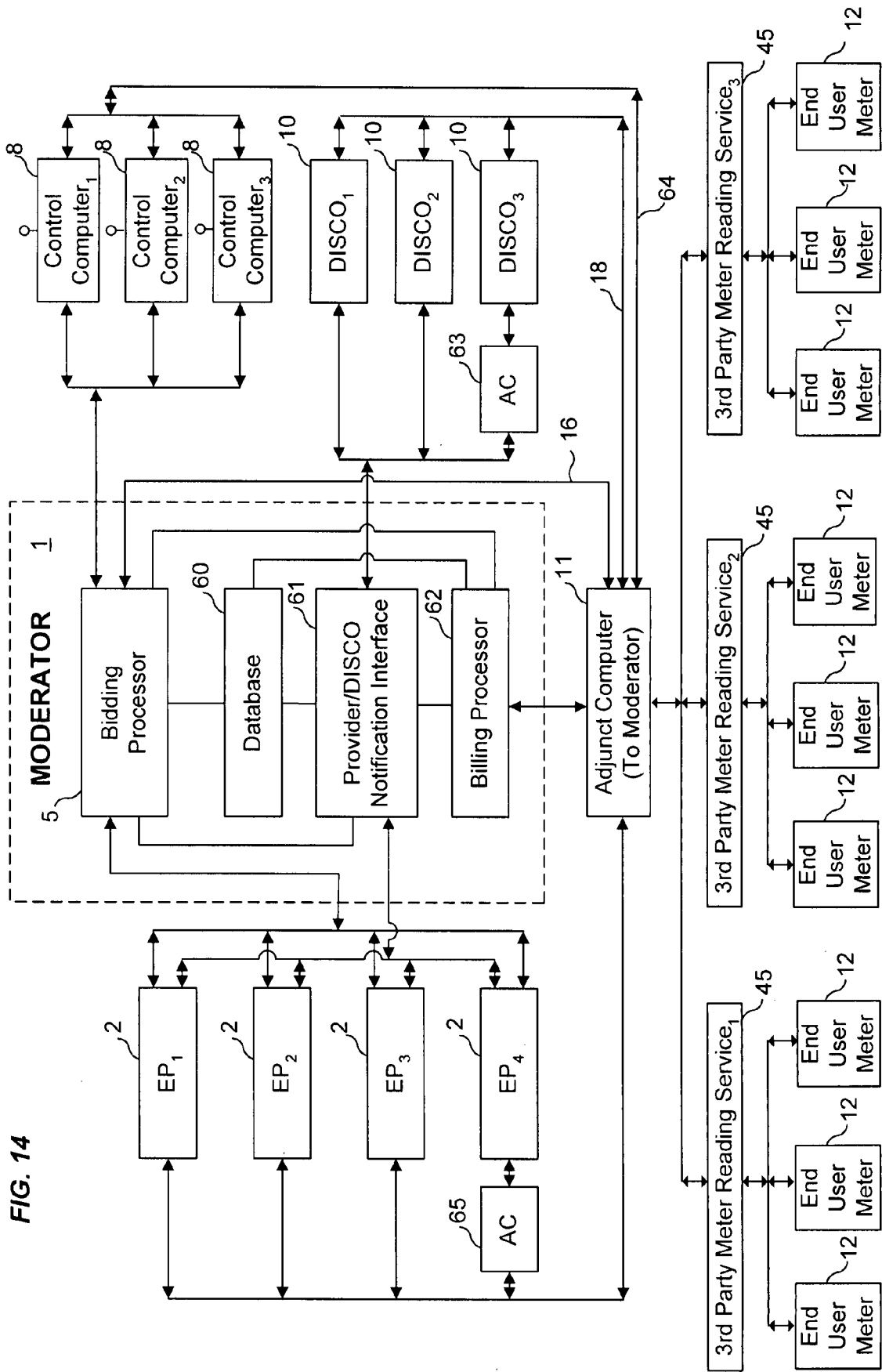
FIG. 14 is a schematic view of an exemplary system of the invention showing third party meter reading service entities (independent of the applicable DISCOs) collecting the meter reading data from the meters of end users participating in the auction service and transmitting such meter reading data to the Moderator's adjunct computer.

FIG. 14 illustrates the same exemplary system as FIG. 13, with the exception that, instead of the meter reading department of the applicable DISCO collecting usage data from end user meters, that function is performed by a third-party meter reading service 45 (independent of the DISCO).

The Moderator, by means of a billing processor, can prepare a billing statement for each end user or reseller and transmit such statement via data link to the selected Provider for that end user or reseller. This billing processor receives from the Moderator's adjunct computer, via data link or data bus, processed meter reading data (including actual energy usage data) for each end user. By accessing the Moderator's database, the billing processor obtains the stored bid information for the bidder selected by the Moderator as the end user's or reseller's Provider during the period of time for which energy usage was measured by the end user's meter (or the meters of end users served by resellers). The billing processor matches this information with the processed meter reading data for that end user or reseller and creates a billing statement.

Figure 15:
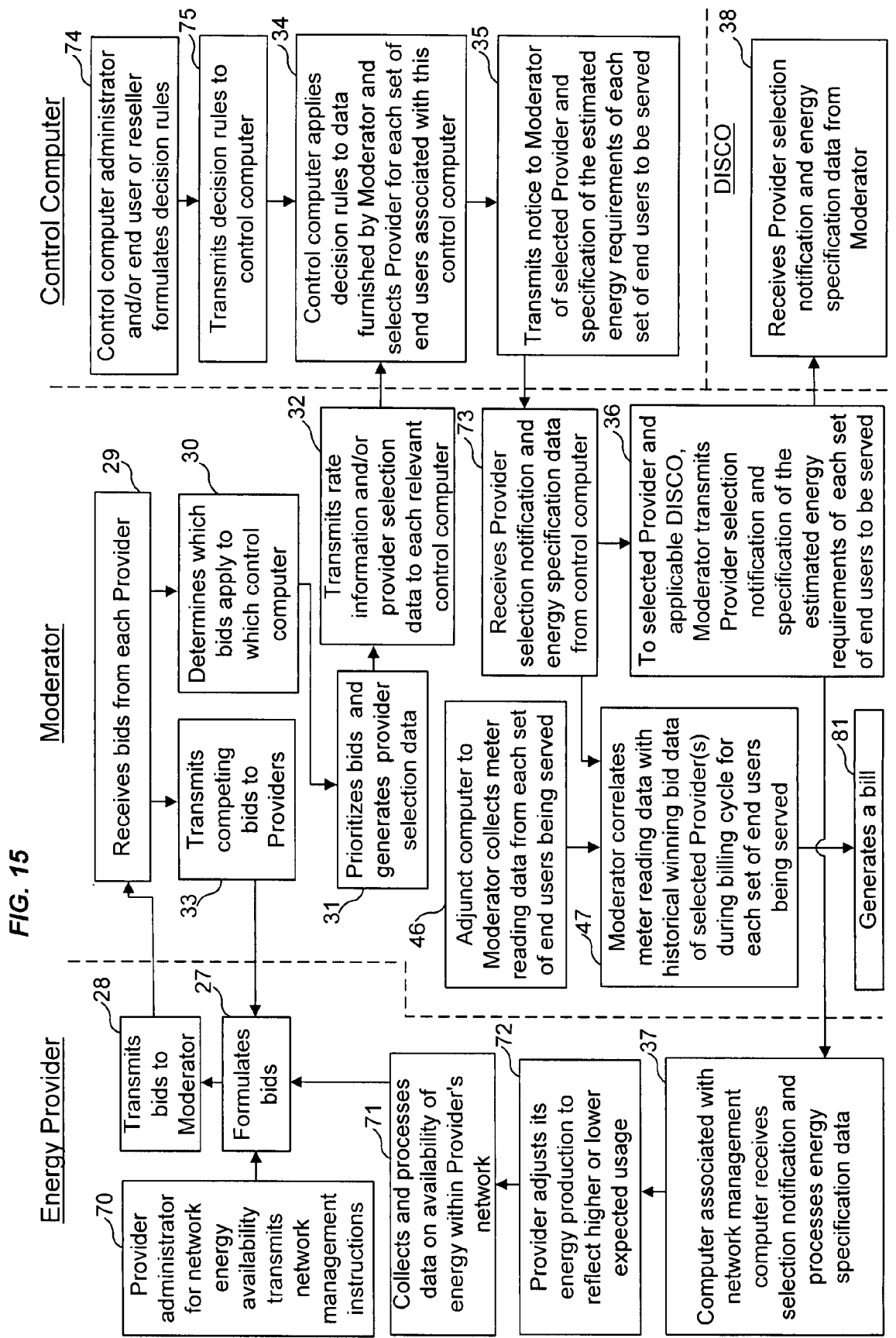
FIG. 15 is a schematic representation of an exemplary method of the invention, including a billing capability in which the Moderator can generate a bill for each end user.

As illustrated in FIG. 15, the Moderator's adjunct computer 46 collects meter reading data from each end user being served and correlates 47 that usage data with the historical bid data of each of the Providers that were selected to serve this end user during various periods over the billing cycle. As a result of this processing, the Moderator can generate a bill for each end user (or the applicable reseller, if any).

Figure 16:
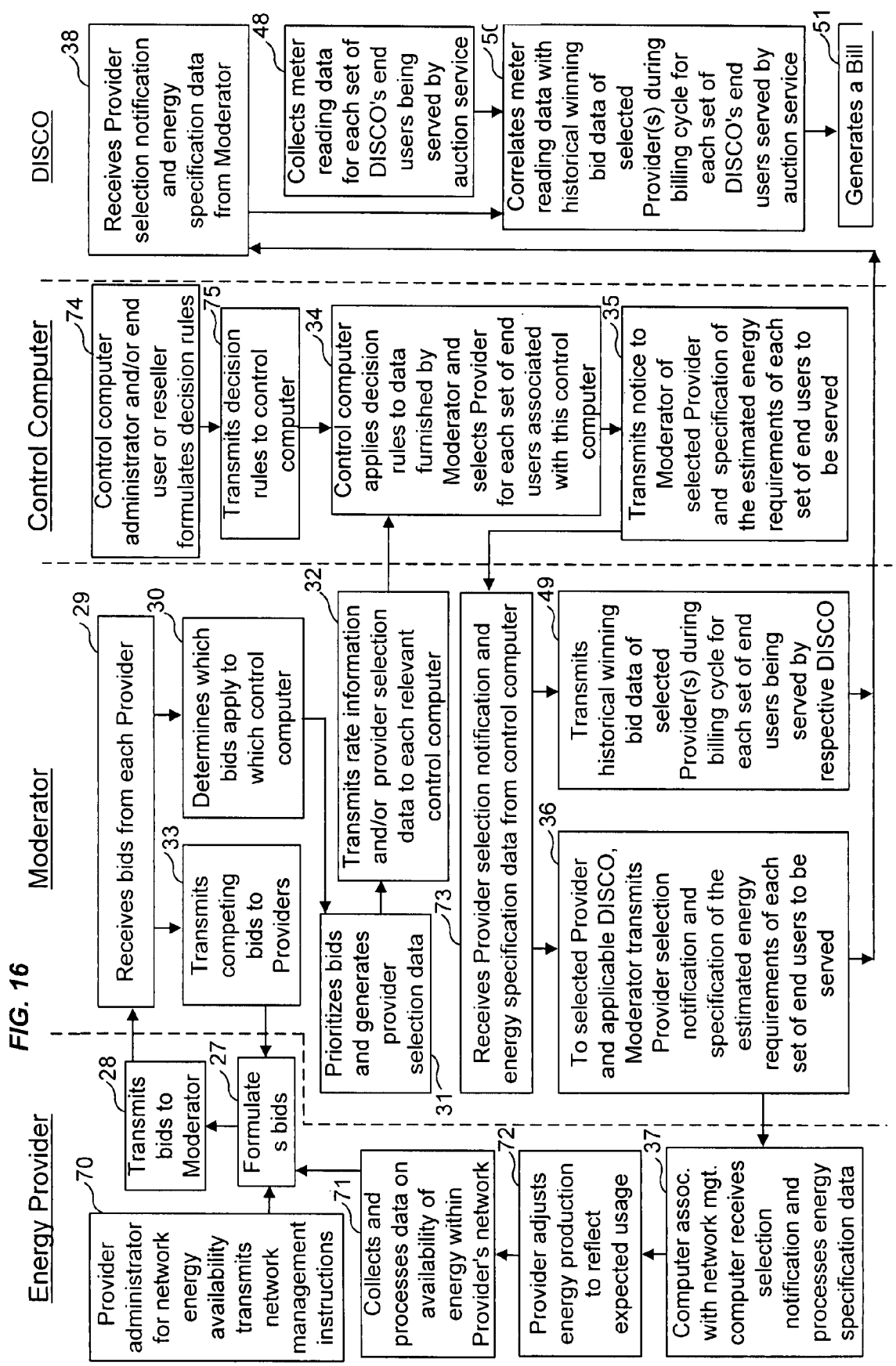
FIG. 16 is a schematic representation of an exemplary method of the invention, including a billing capability in which the applicable DISCO can generate a bill for each end user.

FIG. 16 illustrates an alternative bill generation approach, in which the DISCO serving the applicable end user can generate a bill for that end user (or applicable reseller, if any) if the DISCO is responsible for collecting usage data 48 from end user meters. In this exemplary system, the Moderator transmits 49 to the applicable DISCO the historical bid data of each of the Providers that were selected to serve this end user during various periods over the billing cycle. The DISCO can correlate 50 this bid information with the meter reading data it collected from this end user's meter during the billing cycle in order to generate 51 a bill for this end user (or an applicable reseller, if any).

What is claimed is:

1. A method for conducting an automated bidding process among a plurality of energy Providers for the benefit of end users, the process utilizing a moderating computer and based on an economic choice in accordance with auction rules, the method comprising:
   a. transmitting at least a portion of historical energy usage information associated with at least one end user to at least a portion of a plurality of energy Providers;
   b. receiving, from each Provider of the plurality of energy Providers, including at least one energy Provider to whom the at least a portion of historical energy usage information has been transmitted in Step a., bids to provide energy, consisting of electric power, to the at least one end user;
   c. processing the bids in accordance with the auction rules;
   d. transmitting at least a portion of processed bid information to at least one bidding Provider of the plurality of energy Providers; and
   e. designating, on the basis of the processed bid information, at least one Provider of the plurality of energy Providers to supply at least a portion of the electric power needed by the at least one end user for use at least one end-user facility during a specific future time interval;

wherein each of Steps a., d. and e. is performed by at least one of the moderating computer, the moderating computer working in conjunction with at least one adjunct computer, the moderating computer working in conjunction with a control computer, or the moderating computer working in conjunction with both at least one adjunct computer and a control computer and wherein each of Steps b. and c. is performed by the moderating computer or the moderating computer working in conjunction with at least one adjunct computer.

2. A method of claim 1 in which the auction rules include bid formulation requirements specifying that the bids indicate the quantity of electric power each bidding Provider will provide, at a specific price, to the at least one end user.

3. A method of claim 2 in which the bids to provide electric power include bids to provide at least one block of electric power.

4. A method of claim 1 further including transmitting at least a part of the processed bid information to the at least one end user.

5. A method of claim 1 in which at least a part of the at least a portion of the processed bid information is transmitted to the at least one bidding Provider subsequent to the designating of the at least one Provider to provide electric power to the at least one end user.

6. A method of claim 1 in which at least two Providers of the plurality of energy Providers are each designated to supply at least a portion of the electric power needed by the at least one end user for use at the at least one end-user facility during the specific future time interval, such that the at least two Providers, when their respective designations to supply are summed, are designated to supply 100% of the electric power needed by the at least one end user for use at the at least one end-user facility during at least a portion of the specific future time interval.

7. A method of claim 1 in which the designated Providers, when their respective designations to supply are summed, are designated to supply 100% of the electric power needed by the at least one end user for use at the at least one end-user facility during at least a portion of the specific future time interval.

8. A method of claim 7 in which the bids to provide electric power include bids to provide at least one block of electric power.

9. A method of claim 8 in which the auction rules include bid formulation requirements specifying that the bids indicate the quantity of electric power each bidding Provider will provide, at a specific price, to the at least one end user.

10. A method of claim 1 further including specifying, by at least one of the moderating computer or an adjunct computer to the moderating computer, at least a first default supplier to supply at least a part of the electric power needed by the at least one end user for use at the at least one end-user facility during at least a segment of the specific future time interval.

11. A method of claim 1 in which at least a first Provider is designated to supply a fixed quantity of electric power to provide the at least a portion of the electric power needed by the at least one end user for use at the at least one end-user facility during the specific future time interval, and further including specifying, by at least one of the moderating computer or an adjunct computer to the moderating computer, at least a first default supplier to supply at least a part of the electric power needed by the at least one end user for use at the at least one end-user facility during at least a segment of the specific future time interval.

12. A method of claim 1 further including transmitting, to at least one of the designated at least one Provider, data indicating at least a portion of the quantity of electric power used by the at least one end user during at least a part of the specific future time interval at the at least one end-user facility, said transmitting being performed by at least one of the following: the moderating computer, at least a first adjunct computer to the moderating computer, the control computer, at least a first adjunct computer to the control computer, at least one computer associated with a first DISCO serving the at least one end user, or at least one computer associated with an independent meter reading service entity.

13. A method of claim 1 in which the bids are received by means of a software-defined template.

14. A method of claim 1 further including notifying a first DISCO serving he at least one end user of the designation of the at least one Provider.

15. A method for conducting an automated bidding process among a plurality of energy Providers for the benefit of end users, the process utilizing a moderating computer and based on an economic choice in accordance with auction rules, the method comprising:
   a. transmitting at least a portion of historical energy usage information associated with at least one end user to at least a portion of a plurality of energy Providers;
   b. receiving, from each Provider of the plurality of energy Providers, including at least one energy Provider to whom the at least a portion of historical energy usage information has been transmitted in Step a., bids to provide energy, consisting of electric power, to the at least one end user;
   c. processing the bids in accordance with the auction rules;
   d. transmitting at least a portion of processed bid information to at least one bidding Provider of the plurality of energy Providers; and
   e. designating, on the basis of the processed bid information, at least two Providers of the plurality of energy Providers, with each of said at least two Providers to supply at least a portion of the electric power needed by the at least one end user for use at least one end-user facility during a specific future time interval, such that the at least two Providers, when their respective designations to supply are summed, are designated to supply 100% of the electric power needed by the at least one end user for use at the at least one end-user facility during at least a portion of the specific future time interval;

wherein each of Steps a., d. and e. is performed by at least one of the moderating computer, the moderating computer working in conjunction with at least one adjunct computer, the moderating computer working in conjunction with a control computer, or the moderating computer working in conjunction with both at least one adjunct computer and a control computer and wherein each of Steps b. and c. is performed by the by the moderating computer or the moderating computer working in conjunction with at least one adjunct computer.

16. A method of claim 15 in which the auction rules include bid formulation requirements specifying that the bids indicate the quantity of electric power each bidding Provider will provide, at a specific price, to the at least one end user.

17. A method of claim 15 further including specifying, by at least one of the moderating computer or an adjunct computer to the moderating computer, at least a first default supplier to supply at least a part of the electric power needed by the at least one end user for use at the at least one end-user facility during at least a segment of the specific future time interval.

18. A method of claim 15 in which the bids to provide electric power include bids to provide at least one block of electric power.

19. A method of claim 18 in which the auction rules include bid formulation requirements specifying that the bids indicate the quantity of electric power each bidding Provider will provide, at a specific price, to the at least one end user.

20. A method of claim 15 in which at least a first Provider is designated to supply a fixed quantity of electric power to provide the at least a portion of the electric power needed by the at least one end user for use at the at least one end-user facility during the specific future time interval, and further including specifying, by at least one of the moderating computer or an adjunct computer to the moderating computer, at least a first default supplier to supply at least a part of the electric power needed by the at least one end user for use at the at least one end-user facility during at least a segment of the specific future time interval.

21. A method of claim 15 further including transmitting, to at least one of the designated at least two Providers, data indicating at least a portion of the quantity of electric power used by the at least one end user during at least a part of the at least a portion of the specific future time interval at the at least one end-user facility, said transmitting being performed by at least one of the following: the moderating computer, at least a first adjunct computer to the moderating computer, the control computer, at least a first adjunct computer to the control computer, at least one computer associated with a first DISCO serving the at least one end user, or at least one computer associated with an independent meter reading service entity.

22. A method for conducting an automated bidding process among a plurality of energy Providers for the benefit of end users, the process utilizing a moderating computer and based on an economic choice in accordance with auction rules, the method comprising:

a. transmitting at least a portion of historical energy usage information associated with at least one end user to at least a portion of a plurality of energy Providers;

b. receiving, from each Provider of the plurality of energy Providers, including at least one energy Provider to whom the at least a portion of historical energy usage information has been transmitted in Step a., bids to provide energy, consisting of electric power, to the at least one end user;

c. processing the bids in accordance with the auction rules;

d. transmitting at least a portion of processed bid information to at least one bidding Provider of the plurality of energy Providers;

e. designating, on the basis of the processed bid information, at least one Provider of the plurality of energy Providers to supply at least a portion of the electric power needed by the at least one end user for use at least one end-user facility during a specific future time interval; and f. transmitting, to at least one of the designated at least one Provider, data indicating at least a portion of the quantity of electric power used by the at least one end user during at least a part of the specific future time interval at the at least one end-user facility;

wherein each of Steps a., d., e. and f. is performed by at least one of the moderating computer, the moderating computer working in conjunction with at least one adjunct computer, the moderating computer working in conjunction with a control computer, or the moderating computer working in conjunction with both at least one adjunct computer and a control computer and wherein each of Steps b. and c. is performed by the moderating computer or the moderating computer working in conjunction with at least one adjunct computer.

23. A method of claim 22 in which the auction rules include bid formulation requirements specifying that the bids indicate the quantity of electric power each bidding Provider will provide, at a specific price, to the at least one end user.

24. A method of claim 23 in which the bids to provide electric power include bids to provide at least one block of electric power.

25. A method of claim 22 in which at least two Providers of the plurality of energy Providers are each designated to supply at least a portion of the electric power needed by the at least one end user for use at the at least one end-user facility during the specific future time interval, such that the at least two Providers, when their respective designations to supply are summed, are designated to supply 100% of the electric power needed by the at least one end user for use at the at least one end-user facility during at least a portion of the specific future time interval.

26. A method of claim 25 in which the designated Providers, when their respective designations to supply are summed, are designated to supply 100% of the electric power needed by the at least one end user for use at the at least one end-user facility during at least a portion of the specific future time interval.

27. A method of claim 26 in which the bids to provide electric power include bids to provide at least one block of electric power.

28. A method of claim 27 in which the auction rules include bid formulation requirements specifying that the bids indicate the quantity of electric power each bidding Provider will provide, at a specific price, to the at least one end user.

29. A method of claim 22 further including specifying, by at least one of the moderating computer or an adjunct computer to the moderating computer, at least a first default supplier to supply at least a part of the electric power needed by the at least one end user for use at the at least one end-user facility during at least a segment of the specific future time interval.

30. A method of claim 22 in which at least a first Provider is designated to supply a fixed quantity of electric power to provide the at least a portion of the electric power needed by the at least one end user for use at the at least one end-user facility during the specific future time interval, and further including specifying, by at least one of the moderating computer or an adjunct computer to the moderating computer, at least a first default supplier to supply at least a part of the electric power needed by the at least one end user for use at the at least one end-user facility during at least a segment of the specific future time interval.

31. A method for conducting an automated bidding process among a plurality of energy Providers for the benefit of Buyers, the process utilizing a moderating computer and based on an economic choice in accordance with auction rules, the method comprising:
   a. receiving, from at least one Buyer, at least one request for future energy supply, consisting of electric power;
   b. processing the at least one request and distributing at least a portion of at least one processed request to a plurality of energy Providers;
   c. transmitting at least a portion of historical energy usage information associated with the at least one Buyer to at least a portion of the plurality of energy Providers;
   d. receiving, from at least three bidding Providers of the plurality of energy Providers, including at least one energy Provider to whom the at least a portion of historical energy usage information has been transmitted in Step c., bids to provide electric power to the at least one Buyer;
   e. processing the bids in accordance with the auction rules;
   f. transmitting at least a portion of processed bid information to at least one of the at least three bidding Providers; and
   g. designating, on the basis of the processed bid information, at least two Providers of the at least three bidding Providers, with each of said at least two Providers to supply at least a portion of the electric power needed by the at least one Buyer for use at least one end-user facility during a specific future time interval, such that the at least two Providers, when their respective designations to supply are summed, are designated to supply 100% of the electric power needed by the at least one Buyer for use at the at least one end-user facility during at least a portion of the specific future time interval;
wherein each of Steps a., c., f. and g. is performed by at least one of the moderating computer, the moderating computer working in conjunction with at least one adjunct computer, the moderating computer working in conjunction with a control computer, or the moderating computer working in conjunction with both at least one adjunct computer and a control computer and wherein each of Steps b., d. and e. is performed by the moderating computer or the moderating computer working in conjunction with at least one adjunct computer.

32. A method of claim 31 in which the auction rules include bid formulation requirements specifying that the bids indicate the quantity of electric power each bidding Provider will provide, at a specific price, to the at least one Buyer.

33. A method of claim 32 in which the bids to provide electric power include bids to provide at least one block of electric power.

34. A method of claim 31 further including specifying, by at least one of the moderating computer or an adjunct computer to the moderating computer, at least a first default supplier to supply at least a part of the electric power needed by the at least one Buyer for use at the at least one end-user facility during at least a segment of the specific future time interval.

35. A method of claim 31 in which at least a first Provider is designated to supply a fixed quantity of electric power to provide the at least a portion of the electric power needed by the at least one Buyer for use at the at least one end-user facility during the specific future time interval, and further including specifying, by at least one of the moderating computer or an adjunct computer to the moderating computer, at least a first default supplier to supply at least a part of the electric power needed by the at least one Buyer for use at the at least one end-user facility during at least a segment of the specific future time interval.

36. A method of claim 31 further including transmitting, to at least one of the designated at least two Providers, data indicating at least a portion of the quantity of electric power supplied to the at least one Buyer for use during at least a part of the at least a portion of specific future time interval at the at least one end-user facility, said transmitting being performed by at least one of the following: the moderating computer, at least a first adjunct computer to the moderating computer, the control computer, at least a first adjunct computer to the control computer, at least one computer associated with a first DISCO serving the at least one end user, or at least one computer associated with an independent meter reading service entity.

37. A method of claim 31 including distributing the at least a portion of the at least one processed request to the plurality of energy Providers by posting the at least a portion of the at least one processed request on a website or computer bulletin board accessible to the plurality of energy Providers.

38. A method of claim 31 in which the bids are received by means of a software-defined template.

39. A method for conducting an automated bidding process among a plurality of energy Providers for the benefit of Buyers, the process utilizing a moderating computer and based on an economic choice in accordance with auction rules, the method comprising:
   a. receiving, from at least one Buyer, at least one request for future energy supply, consisting of electric power;
   b. processing the at least one request and distributing at least a portion of at least one processed request to a plurality of energy Providers;
   c. transmitting at least a portion of historical energy usage information associated with the at least one Buyer to at least a portion of the plurality of energy Providers;
   d. receiving, from at least two bidding Providers of the plurality of energy Providers, including at least one energy Provider to whom the at least a portion of historical energy usage information has been transmitted in Step c., bids to provide electric power to the at least one Buyer;
   e. processing the bids in accordance with the auction rules;
   f. transmitting at least a portion of processed bid information to at least one of the at least two bidding Providers;
   g. designating, on the basis of the processed bid information, at least one Provider of the at least two bidding Providers to supply at least a portion of the electric power needed by the at least one Buyer for use at least one end-user facility during a specific future time interval; and
   h. transmitting, to at least one of the designated at least one Provider, data indicating at least a portion of the quantity of electric power supplied to the at least one Buyer for use during at least a part of the specific future time interval at the at least one end-user facility;
wherein each of Steps a., c., f., g. and h. is performed by at least one of the moderating computer, the moderating computer working in conjunction with at least one adjunct computer, the moderating computer working in conjunction with a control computer, or the moderating computer working in conjunction with both at least one adjunct computer and a control computer and wherein each of Steps b., d. and e. is performed by the moderating computer or the moderating computer working in conjunction with at least one adjunct computer.

40. A method of claim 39 in which the auction rules include bid formulation requirements specifying that the bids indicate the quantity of electric power each bidding Provider will provide, at a specific price, to the at least one Buyer.

41. A method of claim 40 in which the bids to provide electric power include bids to provide at least one block of electric power.

42. A method of claim 39 in which at least two Providers of the at least two bidding Providers are designated to supply at least a portion of the electric power needed by the at least one Buyer for use at the at least one end-user facility during the specific future time interval.

43. A method of claim 42 in which the at least two Providers, when their respective designations to supply are summed, are designated to supply 100% of the electric power needed by the at least one Buyer for use at the at least one end-user facility during at least a portion of the specific future time interval.

44. A method of claim 43 in which the bids to provide electric power include bids to provide at least one block of electric power.

45. A method of claim 44 in which the auction rules include bid formulation requirements specifying that the bids indicate the quantity of electric power each bidding Provider will provide, at a specific price, to the at least one Buyer.

46. A method of claim 39 further including specifying, by at least one of the moderating computer or an adjunct computer to the moderating computer, at least a first default supplier to supply at least a part of the electric power needed by the at least one Buyer for use at the at least one end-user facility during at least a segment of the specific future time interval.

47. A method of claim 39 in which at least a first Provider is designated to supply a fixed quantity of electric power to provide the at least a portion of the electric power needed by the at least one Buyer for use at the at least one end-user facility during the specific future time interval, and further including specifying, by at least one of the moderating computer or an adjunct computer to the moderating computer, at least a first default supplier to supply at least a part of the electric power needed by the at least one Buyer for use at the at least one end-user facility during at least a segment of the specific future time interval.

* * * * *